US011863720B2

(12) United States Patent  
Sugiyama

(10) Patent No.: US 11,863,720 B2  
(45) Date of Patent: Jan. 2, 2024

(54) IMAGE RECORDING APPARATUS AND STORAGE MEDIUM STORING PROGRAM

(71) Applicant: BROTHER KOGYO KABUSHIKI KAISHA, Nagoya (JP)

(72) Inventor: Ayako Sugiyama, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/171,739

(22) Filed: Feb. 21, 2023

(65) Prior Publication Data

US 2023/0319204 A1 Oct. 5, 2023

(30) Foreign Application Priority Data

Mar. 31, 2022 (JP) ................................. 2022-060738

(51) Int. Cl.  
*H04N 1/00* (2006.01)

(52) U.S. Cl.  
CPC ..... *H04N 1/00679* (2013.01); *H04N 1/00474* (2013.01); *H04N 1/00482* (2013.01); *H04N 1/00591* (2013.01)

(58) Field of Classification Search  
CPC ........... H04N 1/00679; H04N 1/00474; H04N 1/00482; H04N 1/00591  
See application file for complete search history.

(56) References Cited

U.S. PATENT DOCUMENTS

| | | | | |
|---|---|---|---|---|
| 2006/0269311 | A1* | 11/2006 | Yamauchi | G03G 15/502 399/82 |
| 2009/0168094 | A1* | 7/2009 | Horiuchi | G06F 3/1232 358/1.15 |

FOREIGN PATENT DOCUMENTS

| | | |
|---|---|---|
| JP | 9-22153 A | 1/1997 |
| JP | 2013-5412 A | 1/2013 |
| JP | 2018-186448 A | 11/2018 |

* cited by examiner

*Primary Examiner* — Quang N Vo  
(74) *Attorney, Agent, or Firm* — Merchant & Gould P.C.

(57) ABSTRACT

A conveyor is configured to convey a sheet in a conveyance direction. A print engine is configured to perform image recording of recording an image on the sheet conveyed by the conveyor. A cutter is configured to cut the sheet. A display is configured to display a screen. A controller is configured to: control the print engine to perform the image recording based on acquired first recording data; control the cutter to cut the sheet at a particular position; in response to determining that recording of the first recording data is not performed on at least one of sheets acquired by cutting of the cutter, control the display to display a first object indicating that a blank sheet will be generated after the cutting, the blank sheet being a sheet on which an image can be recorded.

14 Claims, 17 Drawing Sheets

IMAGE RECORDING APPARATUS AND STORAGE MEDIUM STORING PROGRAM

REFERENCE TO RELATED APPLICATIONS

This application claims priority from Japanese Patent Application No. 2022-060738 filed on Mar. 31, 2022. The entire content of the priority application is incorporated herein by reference.

BACKGROUND ART

An image recording apparatus having a cutter that cuts a sheet inside a housing is known.

DESCRIPTION

A copier includes a scanner section for reading image information of a document, a printer section for forming an image based on the image information, and a cutter for cutting a copy sheet P on which the image is copied at a particular position. Thus, for example, an A4 size document image can be arranged on A3 size copy sheet P and two copies are obtained.

When the copier cuts one sheet into two sheets in a cutting process, the number of sheets on which images are recorded after cutting process may be an odd number. In this case, a sheet is generated on which no image is recorded after cutting process, resulting in a poor yield.

In view of the foregoing, an example of an object of this disclosure is to suppress occurrence of a sheet on which no image is recorded after a cutting process.

According to one aspect, this specification discloses an image recording apparatus. The image recording apparatus includes a conveyor, a print engine, a cutter, a display, and a controller. The conveyor is configured to convey a sheet in a conveyance direction. The print engine is configured to perform image recording of recording an image on the sheet conveyed by the conveyor. The cutter is configured to cut the sheet. The display is configured to display a screen. The controller is configured to: control the print engine to perform the image recording based on acquired first recording data; control the cutter to cut the sheet at a particular position; in response to determining that recording of the first recording data is not performed on at least one of sheets acquired by cutting of the cutter, control the display to display a first object indicating that a blank sheet will be generated after the cutting, the blank sheet being a sheet on which an image can be recorded. Thus, a user recognizes before recording that a blank sheet after cutting will be generated if data to be executed is recorded. Thus, the user can make a change so that a blank sheet after cutting will not be generated, which suppresses an occurrence of a blank sheet after cutting.

According to another aspect, this specification also discloses a non-transitory computer-readable storage medium storing a set of program instructions for a computer connected to an image recording apparatus and a display. The image recording apparatus includes a conveyor configured to convey a sheet in a conveyance direction, a print engine configured to record an image on the sheet, a cutter configured to cut the sheet, and a controller. The set of program instructions, when executed by the computer, causes the computer to perform: generating image data information from acquired first recording data, the image data information being information for performing image recording of recording an image on a sheet by the print engine; generating sheet cutting information, the sheet cutting information being information for cutting the sheet at a particular position in the conveyance direction by the cutter; transmitting the image data information and sheet cutting information from the controller to the print engine and the cutter; and in response to determining that recording of the first recording data is not performed on at least one of sheets acquired by cutting of the cutter, transmitting a signal for displaying a first object on the display, the first object indicating that a blank sheet will be generated after the cutting, the blank sheet being a sheet on which an image can be recorded. With this configuration, the first object is displayed by using the computer and the display.

An image recording apparatus may further include a communication interface configured to be connected to an external apparatus. A display of the external apparatus may display that a blank sheet will be generated after the cutting. In this case, a user can recognize before recording, by the display of the external apparatus, that a blank sheet after cutting will be generated if data to be executed is recorded. Thus, the user can make a change so that a blank sheet after cutting will not be generated, which suppresses an occurrence of a blank sheet after cutting.

Hereinafter, embodiments of the present disclosure will be described with reference to the drawings as appropriate. In this embodiment, a vertical direction (upper-lower direction) 1 is defined based on an installation state in which an image recording apparatus 10 is used. A left-right direction 2 is defined when an LCD 22 is viewed from the front. A front-rear direction 3 is defined assuming that the surface on which the LCD 22 is provided is the front surface.

Figure 1:
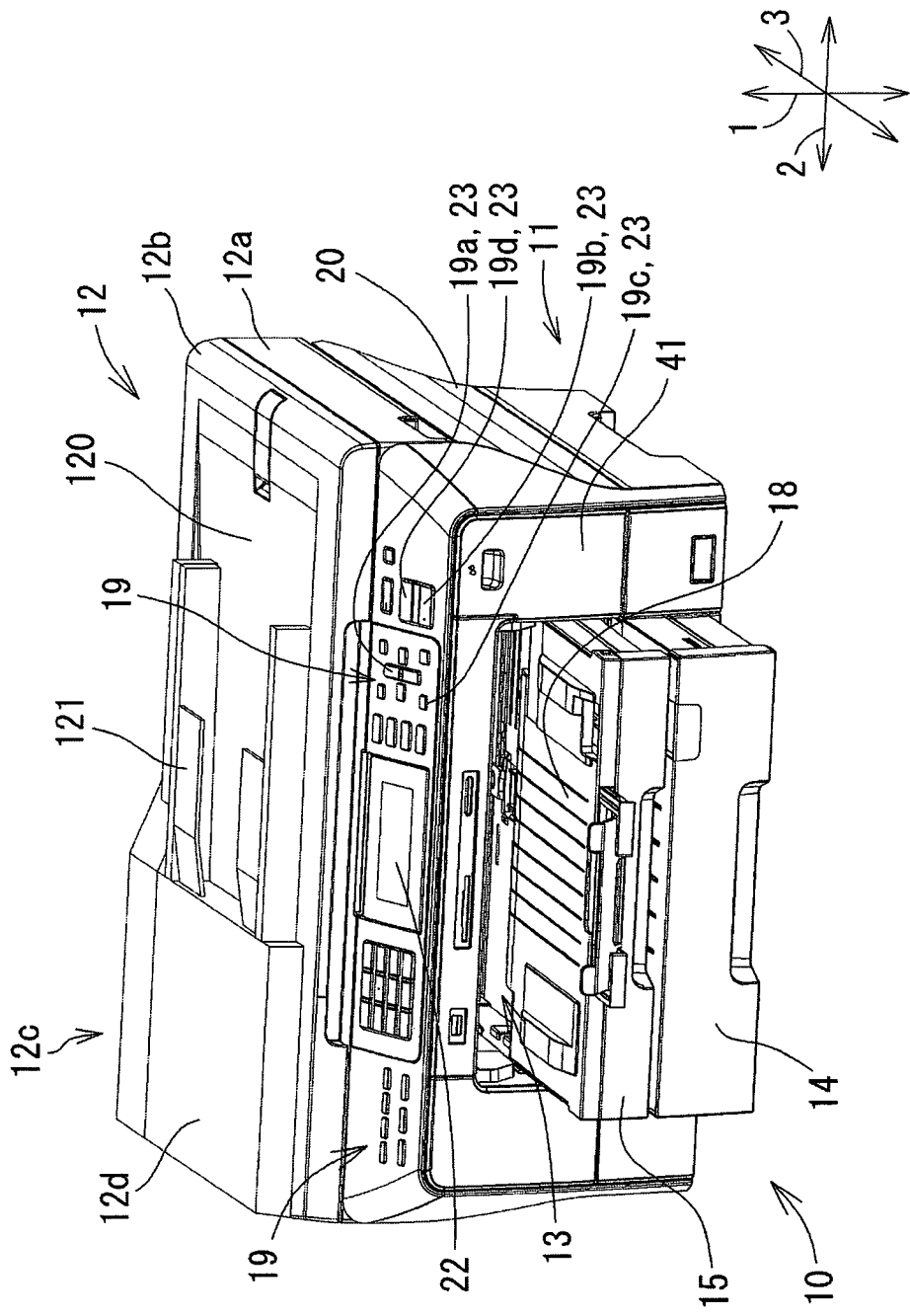
FIG. 1 is an external perspective view of an image recording apparatus 10.

As shown in FIG. 1, the image recording apparatus 10 is a multifunction peripheral integrally including a printer section 11 provided at the bottom and a scanner section 12 (an example of a scanner) provided at the top. The image recording apparatus 10 has a print function, a scan function, a copy function, and a facsimile function. In this embodiment, a case where the image recording apparatus 10 is used alone will be described.

In the scan function, image data of a document 9 (see FIG. 4) read by the scanner section 12 is transferred to and stored in various storage media such as a memory card and a USB (Universal Serial Bus) memory. In the copy function, the printer section 11 records an image on a recording sheet 8 (an example of a sheet) based on the image data of the document 9 read by the scanner section 12. In the facsimile function, the image data read by the scanner section 12 is transmitted by facsimile through a telephone network and so on. The received facsimile data is recorded on the recording sheet 8 by the printer section 11. The scanner section 12 and the printer section 11 are controlled by a controller 100 (see FIG. 5).

An operation interface 19 and a liquid crystal display (hereinafter also referred to as LCD, an example of a display) 22 are provided on the upper front portion of the image recording apparatus 10. The operation interface 19 receives input of information from a user.

Screens are displayed on the LCD 22 such that the user can visually check various information of the image recording apparatus 10. The image recording apparatus 10 operates based on instruction information that is input by operation on the operation interface 19. The controller 100 displays a screen on the LCD 22 such that the user can check each operation. The operation interface 19 has physical keys 23. The physical keys 23 include a selection button 19a for moving a highlighted object on the screen displayed on the LCD 22, an enter button 19b (determination button) for determining the selection of a moved highlighted object, a clear button 19c for returning a screen or canceling determination, and a home button 19d for displaying a home screen 190. The selection button 19a is a so-called cursor key for inputting movement up, down, left, and right.

[Printer Section 11]

Figure 2:
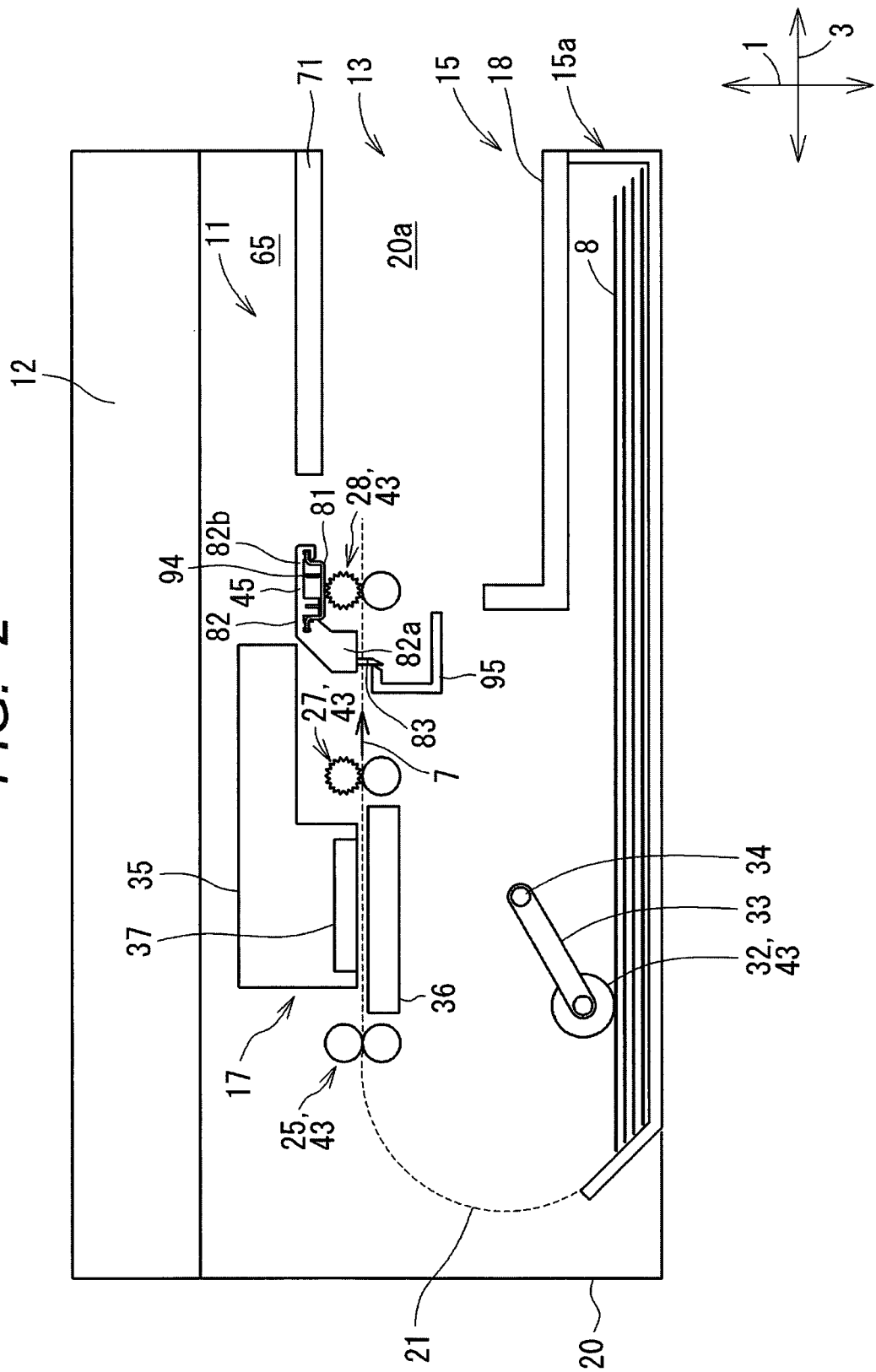
FIG. 2 is a diagram schematically showing a structure of the image recording apparatus 10.

The configuration of the printer section 11 will be described below with reference to FIGS. 1 to 3. In FIG. 2, illustration of the detailed configuration of the scanner section 12 and a sheet feed cassette 14 is omitted for simplification of explanation.

As shown in FIGS. 1 and 2, the printer section 11 has a housing 20. The housing 20 includes the sheet feed cassette 14, a sheet feed cassette 15, a recording section 17, a cutter 45, and other functional components. An opening 13 is located below the operation interface 19 on the front surface of the housing 20. The opening 13 is located substantially at the center in the left-right direction 2 on the front surface of the housing 20. The opening 13 is formed in a rectangular shape elongated in the left-right direction 2. The opening 13 extends from the upper part to the lower end on the front surface of the housing 20.

The housing 20 has an internal space 20a extending rearward in the front-rear direction 3 from the opening 13. The internal space 20a communicates with a conveyance path 21 described later. An upper wall 71 partitions a board accommodation space 65 arranged at the rear of the operation interface 19 from the internal space 20a. The board accommodation space 65 accommodates a board (not shown) on which an electronic circuit electrically connected to the operation interface 19 is mounted.

An open-close cover 41 is attached to the right of the opening 13 on the front surface of the housing 20. When the open-close cover 41 is opened, a cartridge mounting space is opened, and ink cartridges 40 storing ink are attachable to or detachable from the housing 20. The ink cartridge 40 supplies ink to a recording head 37 of the recording section 17 (an example of an image recording section and a print engine) through a tube 44.

The sheet feed cassette 14 and the sheet feed cassette 15 are inserted into and removed from the housing 20 along the front-rear direction 3. The sheet feed cassette 14 is located below the sheet feed cassette 15 in a state where the sheet feed cassette 14 is attached to the housing 20. The sheet feed cassette 15 accommodates a plurality of standard-sized recording sheets 8 in a stacked state. For example, the standard size of the recording sheet 8 is A3 size, A4 size, A5 size, B4 size, B5 size, and so on of Japanese Industrial Standards. A sheet discharge tray 18 is located above the sheet feed cassette 15. The sheet discharge tray 18 supports the recording sheet 8 discharged from the conveyance path 21. Although two types of the sheet feed cassettes 14 and 15 are provided in this embodiment, the sheet feed cassette 14 may be omitted.

The sheet feed cassette 15 holds a plurality of recording sheets 8. The recording sheets 8 are held in a stacked state in the internal space of the sheet feed cassette 15. The sheet discharge tray 18 is formed on the front side of the image recording apparatus 10 (on the right side in FIG. 2). FIG. 2 shows a state in which the sheet feed cassette 15 is inserted into the housing 20.

As shown in FIG. 2, a conveyance section 43 is arranged in the housing 20 for conveying the recording sheet 8 from the sheet feed cassette 15 to the sheet discharge tray 18 along the conveyance path 21. The conveyance path 21 is a so-called U-turn path that curves upward and forward from the sheet feed cassette 15 and makes a U-turn, and extends linearly forward toward the sheet discharge tray 18. A downstream end of the conveyance path 21 communicates with the internal space 20a.

In the conveyance path 21, a feed roller 32, a PF roller pair 25, a first discharge roller pair 27, and a second discharge roller pair 28 are arranged in this order from the upstream side along a conveyance direction 7 of the recording sheet 8 from the sheet feed cassette 15 to the sheet discharge tray 18. The feed roller 32 and the roller pairs 25, 27, and 28 constitute the conveyance section 43.

The feed roller 32 is located above the sheet feed cassette 15. The feed roller 32 is provided at the tip of an arm 33 so as to be rotatable about an axis in the left-right direction 2. A base end of the arm 33 is rotatable around a shaft 34. When the feed roller 32 rotates, the uppermost recording sheet 8 among the plurality of recording sheets 8 stacked in the sheet feed cassette 15 is sent out to the conveyance path 21.

The PF roller pair 25 is located near the downstream end of the curved portion of the conveyance path 21 in the conveyance direction 7. The PF roller pair 25 is rotatable about an axis in the left-right direction 2. The PF roller pair 25 is rotated by transmission of the drive of a conveyance motor 116 (see FIG. 5). The recording sheet 8 is sandwiched between the PF roller pair 25 and conveyed to a position below the recording head 37.

The first discharge roller pair 27 and the second discharge roller pair 28 are located downstream of the recording head 37 in the conveyance direction 7 in the conveyance path 21.

The first discharge roller pair 27 is located upstream of the second discharge roller pair 28 in the conveyance direction 7. The first discharge roller pair 27 and the second discharge roller pair 28 are rotated by transmission of the drive of the conveyance motor 116. The recording sheet 8 conveyed by the PF roller pair 25 is sandwiched between the first discharge roller pair 27 and the second discharge roller pair 28 and conveyed to the sheet discharge tray 18.

As shown in FIG. 2, the recording section 17 is located between the PF roller pair 25 and the first discharge roller pair 27 in the conveyance path 21. The recording section 17 records an image on the recording sheet 8 conveyed by the conveyance section 43. The recording section 17 has a carriage 35 located above the conveyance path 21, a platen 36 located below the conveyance path 21, and a recording head 37 mounted on the carriage 35.

Figure 3:
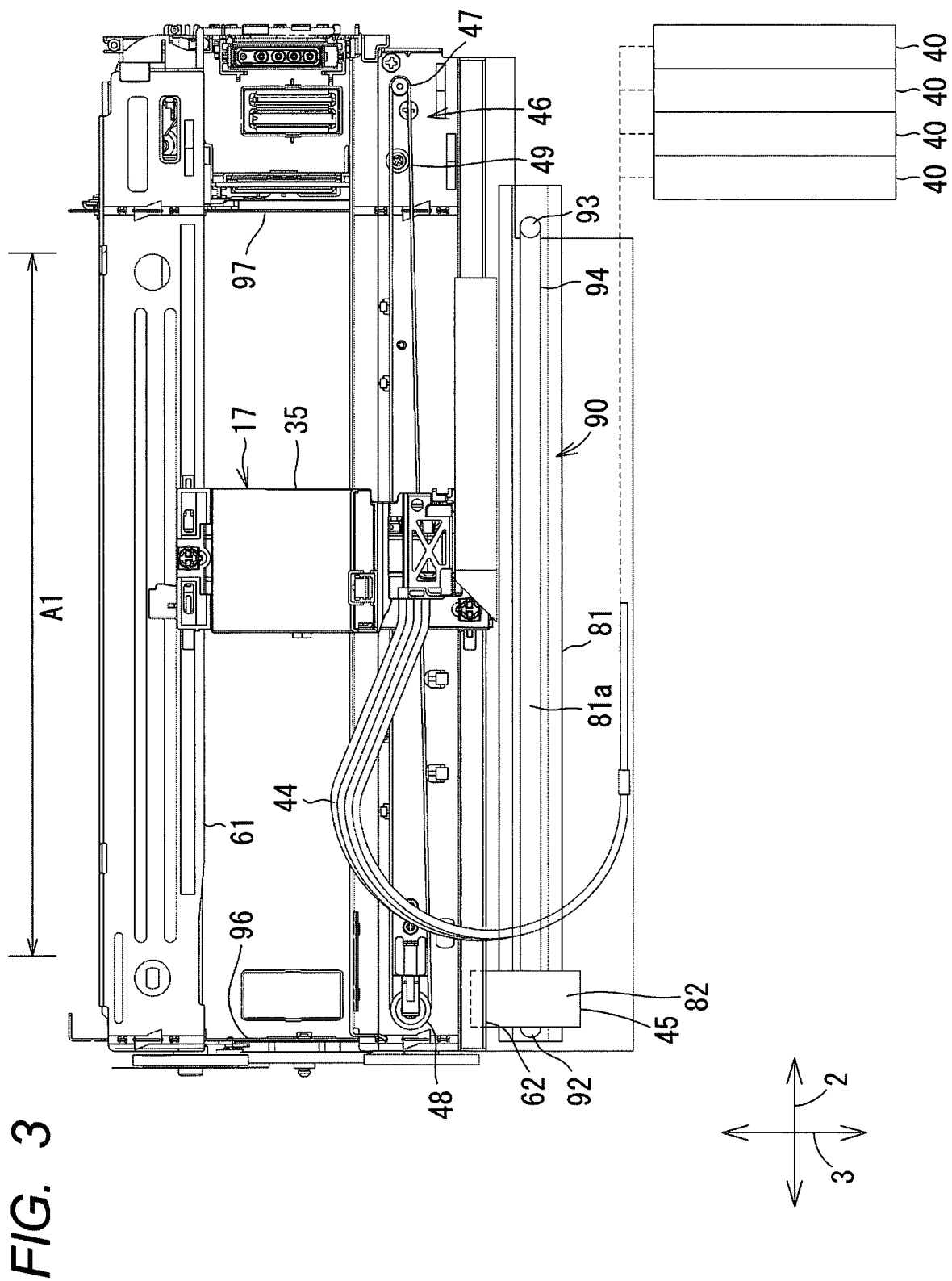
FIG. 3 is a plan view showing a main configuration of the image recording apparatus 10.

As shown in FIGS. 2 and 3, the recording head 37 is a so-called inkjet type in which ink of each color of cyan (C), magenta (M), yellow (Y), and black (Bk) is supplied from the ink cartridge 40 through the tube 44 and each ink is ejected as small ink droplets. While the carriage 35 reciprocates in the left-right direction 2, ink droplets are ejected from the recording head 37 to record an image on the recording sheet 8 conveyed over the platen 36.

As shown in FIG. 3, the carriage 35 is slidably supported by guide frames 61 and 62 that are separated in the front-rear direction 3 and each extending in the left-right direction 2. The carriage 35 is mounted so as to straddle the guide frames 61 and 62 so as to reciprocate in the left-right direction 2.

A belt drive mechanism 46 is arranged on the upper surface of the guide frame 62. In the belt drive mechanism 46, an endless annular belt 49 having teeth on the inner side thereof is stretched between a first pulley 47 and a second pulley 48 provided near both ends of the conveyance path 21 in the left-right direction 2. The first pulley 47 and the second pulley 48 are arranged at both ends of the area in which the carriage 35 reciprocates. A driving force is input to the shaft of the first pulley 47 from a carriage (CR) motor (see FIG. 5) 115 as a driving source, and the first pulley 47 is rotated. Rotation of the first pulley 47 causes the belt 49 to circuitously move and the second pulley 48 follows. The belt 49 may be a belt having both ends fixed to the carriage 35, instead of an endless annular belt.

As described above, when the belt 49 circuitously moves, the carriage 35 reciprocates on the guide frames 61 and 62. The recording head 37 is mounted on the carriage 35, and the recording head 37 reciprocates in the left-right direction 2 of the conveyance path 21 as the main scanning direction.

[Cutter 45]

As shown in FIGS. 2 and 3, the cutter 45 is located above the conveyance path 21 at the front of the recording section 17. When stopped, the cutter 45 is located to the left of an image recording area A1. The image recording area A1 is the maximum width in which ink is ejected from the recording head 37 that reciprocates together with the carriage 35 and an image is recorded on the recording sheet 8. If the maximum size recordable by the printer section 11 is A4 size, the image recording area A1 is slightly wider than the width of A4 size.

The cutter 45 cuts the recording sheet 8 conveyed by the conveying section 43 along the left-right direction 2. The cutter 45 cuts the recording sheet 8 by moving rightward from a stop position (the position of the cutter 45 shown in FIG. 3) which is to the left of the image recording area A1. For example, one recording sheet 8 of A4 size is cut into two recording sheets 8 of A5 size by cutting by the cutter 45. The cutter 45 is supported by a guide rail 81 extending in the left-right direction 2 and fixed to side frames 96 and 97. The cutter 45 includes a cutter carriage 82 that moves while being guided by the guide rail 81, a rotary blade 83 to be mounted on the cutter carriage 82, and a fixed blade 95. In FIG. 3, the cutter 45 is simply shown while the detailed configuration is omitted.

The cutter carriage 82 includes a cutter holding portion 82a holding the rotary blade 83 and a connecting portion 82b connected to the guide rail 81. The cutter holding portion 82a is located between the first discharge roller pair 27 and the second discharge roller pair 28. The rotary blade 83 is supported by the cutter holding portion 82a while protruding downward from the lower end of the cutter holding portion 82a. The rotary blade 83 has a disk shape and is rotatably supported by the cutter holding portion 82a in a state where the front-rear direction 3 is its axial direction.

The connecting portion 82b extends forward from the cutter holding portion 82a and is connected to the guide rail 81.

The cutter carriage 82 is driven by a drive mechanism 90. The drive mechanism 90 includes a drive pulley 92 and a follow pulley 93 arranged on the upper surface of a base board 81a, and an endless belt 94 stretched over the drive pulley 92 and the follow pulley 93. The drive pulley 92 and the follow pulley 93 are arranged at both ends in the left-right direction 2 on the upper surface of the base board 81a. Each of the drive pulley 92 and the follow pulley 93 rotates about an axis along the vertical direction 1. The driving force of a cutting motor 114 (see FIG. 5) is transmitted to the drive pulley 92. The endless belt 94 is connected to the cutter carriage 82. When the drive pulley 92 rotates, the endless belt 94 circuitously moves and the follow pulley 93 follows. The circuitous movement of the endless belt 94 causes the cutter carriage 82 to reciprocate along the guide rail 81 in the left-right direction 2.

The fixed blade 95 is located below the cutter holding portion 82a of the cutter carriage 82. The fixed blade 95 is supported by the side frames 96 and 97 and extends in the left-right direction 2 across the image recording area A1. The cutting edge of the fixed blade 95 is in contact with the rotary blade 83 from the rear. The recording sheet 8 is cut by being sandwiched between the rotary blade 83 and the fixed blade 95.

[Scanner Section 12]

Figure 4:
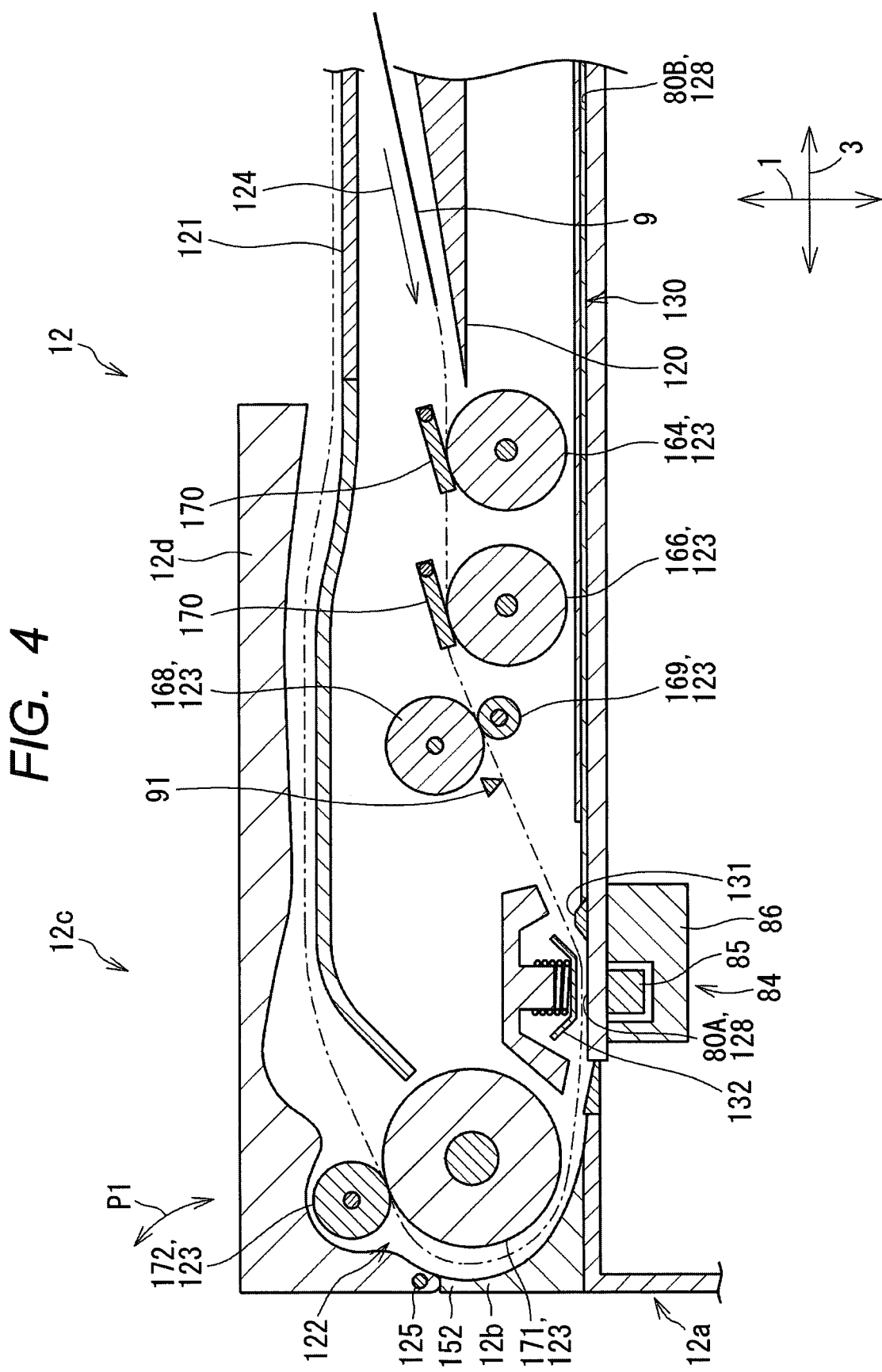
FIG. 4 is a cross-sectional view schematically showing a structure of a scanner section 12 of the image recording apparatus 10.

As shown in FIGS. 1 and 2, the scanner section 12 is located above the printer section 11. The scanner section 12 is a so-called flatbed scanner. The scanner section 12 includes a scanner main body 12a provided above the printer section 11 and a document cover 12b provided above the scanner main body 12a. As shown in FIG. 4, a platen glass 128 on which the document 9 is placed is provided on the upper surface of the scanner main body 12a. An image sensor for optically reading the image of the document 9 on the platen glass 128 is provided inside the scanner main body 12a. The document cover 12b is provided with an ADF 12c that is an automatic conveyance mechanism that picks up and conveys a plurality of documents 9, one sheet at a time, whose images are to be read. The document 9 may be A3 size, A4 size, A5 size, B4 size, B5 size, and so on of Japanese Industrial Standards, but in this embodiment, a case where the document 9 of A4 size will be described as an example.

As shown in FIG. 4, the scanner section 12 includes an ADF document tray 120, an ADF discharge tray 121, a conveyance path 122, a conveyance mechanism 123, a contact image sensor (hereinafter referred to as "CIS") 85.

In the scanner section 12, the document cover 12*b* is attached via a hinge on the rear side so as to be opened and closed. The document cover 12*b* is movable between an open position and a closed position with respect to the scanner main body 12*a* having the platen glass 128.

The platen glass 128 is provided on the upper surface of the scanner main body 12*a*. When the document cover 12*b* is closed with respect to the scanner main body 12*a*, the platen glass 128 is covered with the document cover 12*b*.

An elastic plate 130 is provided on the lower surface of the document cover 12*b*, that is, the surface facing the platen glass 128. The elastic plate 130 contacts the platen glass 128 when the document cover 12*b* is in the closed position. The elastic plate 130 presses and fixes the document 9 placed on the platen glass 128.

A positioning member 131 is provided at the left end of the platen glass 128. The positioning member 131 separates a reading area 80A for reading the image of the document 9 using the ADF 12*c* and a reading area 80B for using the scanner section 12 as a flatbed scanner (FBS). The positioning member 131 is a positioning reference when placing the document 9 on the platen glass 128. When the ADF 12*c* is used, the positioning member 131 functions as a guide for guiding the document 9 passing over the reading area 80A back to the conveyance path 122 provided inside the ADF 12*c*.

A first image reading unit 84 is built in the scanner main body 12*a*. The first image reading unit 84 includes the CIS 85 and a CIS carriage 86. The CIS 85 is located upstream in a conveyance direction 124 of the document 9 on the conveyance path 122. The CIS 85 optically reads the image of the document 9 from below the conveyance path 122. The CIS 85 is mounted on the CIS carriage 86 and reciprocates under the platen glass 128.

As shown in FIGS. 1 and 4, the ADF document tray 120 and the ADF discharge tray 121 are vertically arranged at the document cover 12*b* at an upper part of the scanner section 12. The document 9 discharged from the ADF 12*c* is supported on the ADF discharge tray 121 and held in a state separated from the document on the ADF document tray 120.

The ADF cover 12*d* is pivotable in the direction of arrow P1 in FIG. 4 about a rotation shaft 125 provided on the side of the ADF 12*c* (the left side in FIG. 4), and is configured to expose a part of the inside of the ADF 12*c*.

A conveyance mechanism 123 is provided on the conveyance path 122 inside the ADF 12*c* to convey the document 9 in the conveyance direction 124 from the ADF document tray 120 to the ADF discharge tray 121. The conveyance mechanism 123 is composed of rollers, nip pieces 170, pinch rollers, and so on. The conveyance mechanism 123 includes first rollers 164 and 166, second rollers 168 and 169 and third rollers 171 and 172.

The document 9 is placed on the ADF document tray 120 in a state where the surface to be read faces downward.

The configuration of each roller 164, 166, 168, 171 is merely an example of the conveyance mechanism 123, and it may be changed to a known recording sheet feeding mechanism such as changing the number and arrangement of rollers, using pinch rollers instead of nip pieces, and so on.

A document sensor 91 is located downstream of the second rollers 168 and 169 in the conveyance direction 124. The document sensor 91 detects the document 9 sent by the second rollers 168 and 169. By detecting the leading edge and the trailing edge of the document 9, the document sensor 91 determines the size of the document 9 when performing a reading process.

The positioning member 131 is located downstream of the document sensor 91 in the conveyance direction 124. The positioning member 131 guides the document 9 that has passed the document sensor 91 to a position between the platen glass 128 and the document guide 132.

The first image reading unit 84 is located downstream of the positioning member 131 in the conveyance direction 124. The first image reading unit 84 reads the document 9.

The document guide 132 is provided at a position facing the first image reading unit 84 in the document cover 12*b*. The document guide 132 has a horizontal portion facing the reading area 80A, and inclined portions extending upward on the upstream and downstream sides from both ends of the horizontal portion. The document guide 132 is urged toward the reading area 80A by a spring member fixed to the ADF main body 152.

Figure 5:
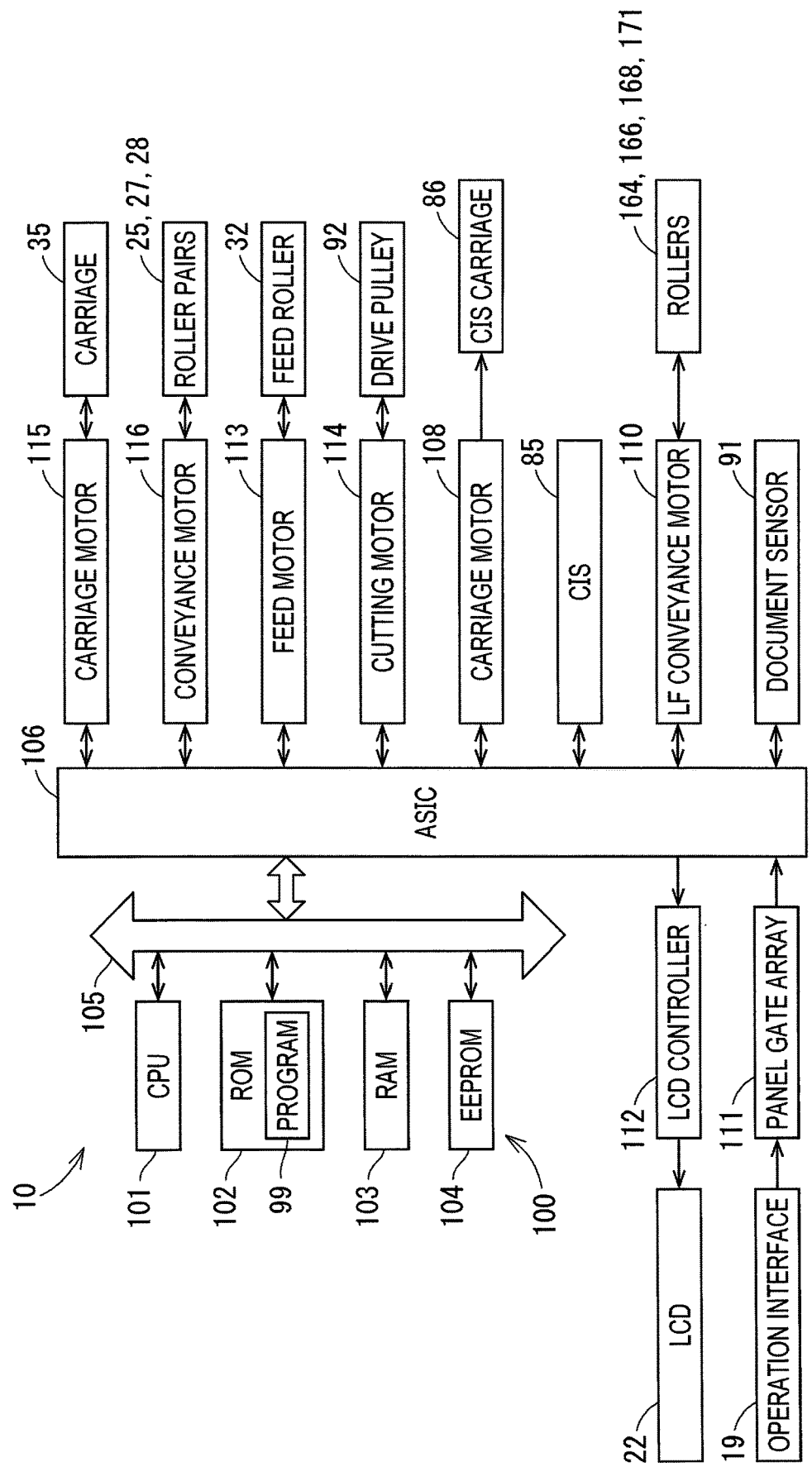
FIG. 5 is a block diagram of the image recording apparatus 10.

The first rollers 164 and 166, the second roller 168, and the third roller 171 are rotated by transmission of driving force from an LF conveyance motor 110 (see FIG. 5).

[Configuration of Controller 100 and Devices]

FIG. 5 shows the arrangement of the controller 100 of the image recording apparatus 10 and its peripheral devices. The controller 100 controls overall operations of the printer section 11 and the scanner section 12. The controller 100 is configured as a microcomputer mainly including a CPU (Central Processing Unit) 101, a ROM (Read Only Memory) 102, a RAM (Random Access Memory) 103, and an EEPROM (Electrically Erasable and Programmable ROM) 104, and is connected to an ASIC (Application Specific Integrated Circuit) 106 via a bus 105.

The ROM 102 stores a program 99 (see FIG. 5) and so on for controlling various operations of the image recording apparatus 10. The EEPROM 104 stores various data used for processing according to the program 99. The RAM 103 is used as a storage area for temporarily recording various data used when the CPU 101 executes the program 99 or as an expansion area for the data and the program 99.

The CPU 101 comprehensively controls peripheral devices constituting the controller 100 or controlled devices controlled by the controller 100. The CPU 101 reads the program 99 stored in the ROM 102 and data stored in the RAM 103 or EEPROM 104, and performs calculations according to the program 99 described above.

The ASIC 106 is connected to the CIS 85 for reading the image of the document 9 in the scanner section 12. Based on a command from the CPU 101, the ASIC 106 provides the CIS 85 with an electrical signal for emitting light from a light source and a timing signal for outputting image data from photoelectric conversion elements. Upon receiving these signals, the CIS 85 irradiates the document 9 with light at a particular timing, and outputs image data converted by the photoelectric conversion elements.

The ASIC 106 is connected with a panel gate array (panel G/A) 111 that controls the operation interface 19 for inputting desired commands to the image recording apparatus 10. The panel gate array 111 detects pressing of the operation interface 19 and outputs a particular code signal. Upon receiving a particular key code from the panel gate array 111, the CPU 101 performs a control process to be executed according to a particular key processing table. The key processing table is a table that associates key codes with control processes, and is stored in the ROM 102, for example.

The ASIC 106 is connected to an LCD controller 112 that controls the screen display of the LCD 22. The LCD controller 112 controls the LCD 22 to display information regarding the operation of the printer section 11 or the scanner section 12 on the screen based on instructions from the CPU 101.

The ASIC 106 is connected with the document sensor 91 for detecting the leading edge and the trailing edge of the document 9 in the conveyance path 122 (see FIG. 4) inside the ADF 12c.

The ASIC 106 is also connected to a carriage (CR) motor 108, a conveyance motor 116, a feed motor 113, and the cutting motor 114. A drive circuit for controlling each motor is built in the ASIC 106. The CPU 101 outputs a drive signal for rotating each motor to the drive circuit corresponding to each motor. The drive circuit outputs a drive current corresponding to the drive signal acquired from the CPU 101 to the corresponding motor. This causes the corresponding motor to rotate. That is, the controller 100 controls the feed motor 113 to feed the recording sheet 8 to the conveyance path 21. The controller 100 controls the conveyance motor 116 to cause the conveyance section 43 to convey the recording sheet 8. The controller 100 controls the carriage motor 115 to move the carriage 35. The controller 100 controls the cutting motor 114 to control the drive pulley 92.

[Processing by Controller 100]

Figure 6:
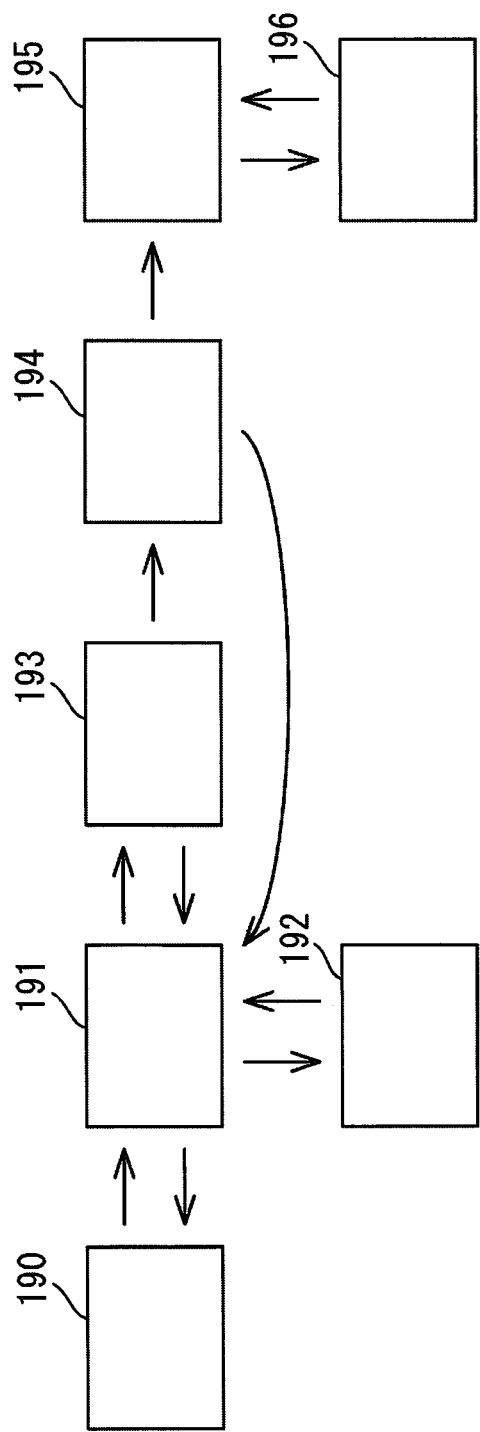
FIG. 6 is an explanatory diagram showing screens displayed on an LCD 22.

The controller 100 executes a reading process, an image recording process, a cutting process, and a display process. In this embodiment, each processing is executed in order of the reading process, the display process, the image recording process, and the cutting process. In more detail, after images of two pages of the original document 9 read in the reading process are recorded on one sheet of the recording sheet 8 in the image recording process, the one sheet of the recording sheet 8 is divided into halves in the cutting process. Hereinafter, by referring to FIGS. 13A and 13B, each screen and operations displayed on the LCD 22 during the reading process, the image recording process, and the cutting process based on preceding recording data and subsequent recording data will be described. In this embodiment, so-called stack printing will be described in which the image recording process and the cutting process are executed while each page of the original document is read in the reading process. FIG. 6 shows an order of transition of each screen.

Figure 7:
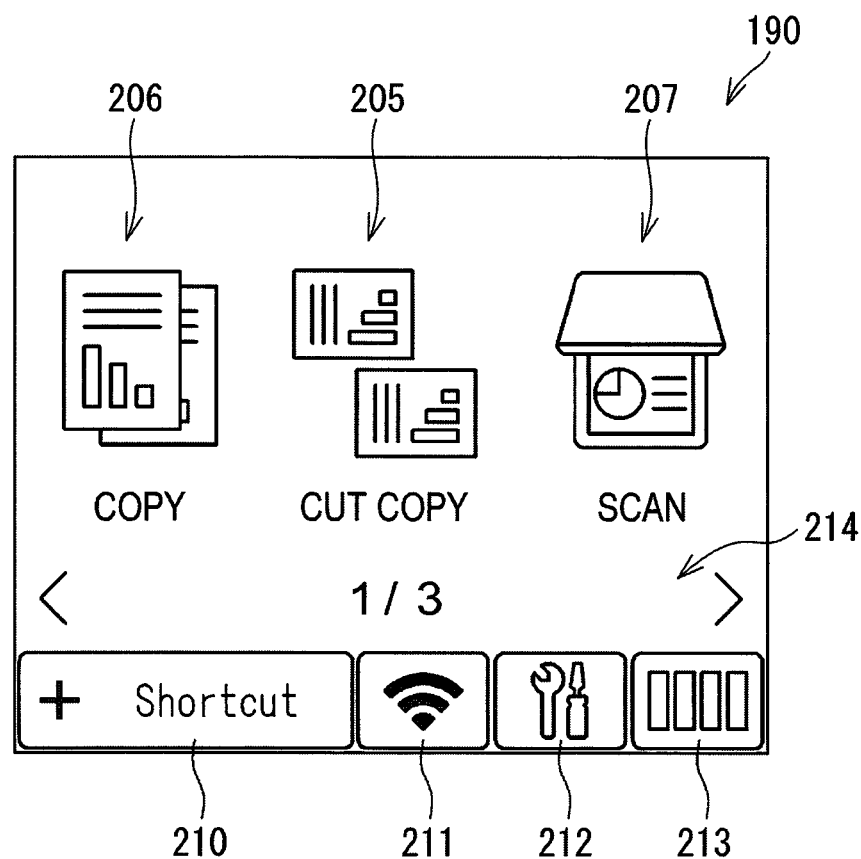
FIG. 7 shows a home screen 190 displayed on the LCD 22 of the image recording apparatus 10.
Figure 7:
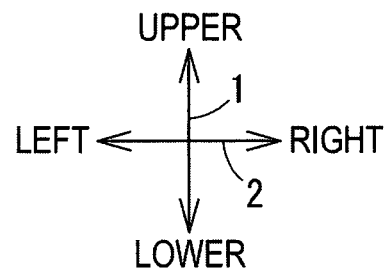

When the power is turned on by the user, the LCD 22 displays the home screen 190. As shown in FIG. 7, the home screen 190 has a first reception portion 205, a second reception portion 206, and a third reception portion 207 aligned in the left-right direction 2 on an upper side of the screen. The home screen 190 has a shortcut icon 210, a communication setting icon 211, an environment setting icon 212, and an ink residual-amount icon 213 on a lower side. At a center in an upper-lower direction 1 of the home screen 190, a switching icon 214 is located.

The first reception portion 205, the second reception portion 206, and the third reception portion 207 are selectable by an operation by the user on the operation interface 19 (see FIG. 1). The first reception portion 205, the second reception portion 206, and the third reception portion 207 are icons on which figures and characters are expressed. Though not shown in each drawing, the first reception portion 205, the second reception portion 206, or the third reception portion 207 being selected is displayed as an icon with brightness inverted. The user moves the inverted display of the icon to an arbitrary direction on the home screen 190 by operating the selection button 19a.

The second reception portion 206 is located on a left side in the left-right direction 2 of the home screen 190. The second reception portion 206 receives an instruction to execute the reading process and the image recording process in a single operation. The second reception portion 206 has a rectangular figure representing the recording sheet 8 and characters "COPY" below the figure.

The first reception portion 205 is located at the center in the left-right direction 2 of the home screen 190. The first reception portion 205 receives an instruction to execute the reading process, the image recording process, and the cutting process. The first reception portion 205 has a figure having two rectangular shapes representing cut recording sheets 8 and characters "CUT COPY" below the figure.

The third reception portion 207 is located on a right side in the left-right direction 2 of the home screen 190. The third reception portion 207 receives an instruction to execute the reading process. The third reception portion 207 has a figure showing a state in which one sheet of the original document 9 expressed by a laterally long rectangle is set on a scanner whose cover is open and characters "SCAN" below the figure.

The shortcut icon 210, the communication setting icon 211, the environment setting icon 212, and the ink residual-amount icon 213 are disposed in order from the left side toward the right side of the home screen 190. The shortcut icon 210 is an icon for setting such that the user rapidly displays frequently-used commands, the icon being indicated with characters "Shortcut". The communication setting icon 211 is an icon for receiving setting for connecting the image recording apparatus 10 to an external apparatus, the icon being indicated by a mark representing radio waves. The environment setting icon 212 is an icon for setting an environment on an operation of the image recording apparatus 10 and is indicated by an icon representing tools. The ink residual-amount icon 213 is an icon for displaying a residual amount of ink in each color at the current time, the icon being indicated by a gauge in each color.

By causing the icons indicated by left and right arrows in the switching icon 214 to be selected by inverted displayed, the controller 100 selects other functions not displayed on the home screen 190 (not shown).

Figure 13A:
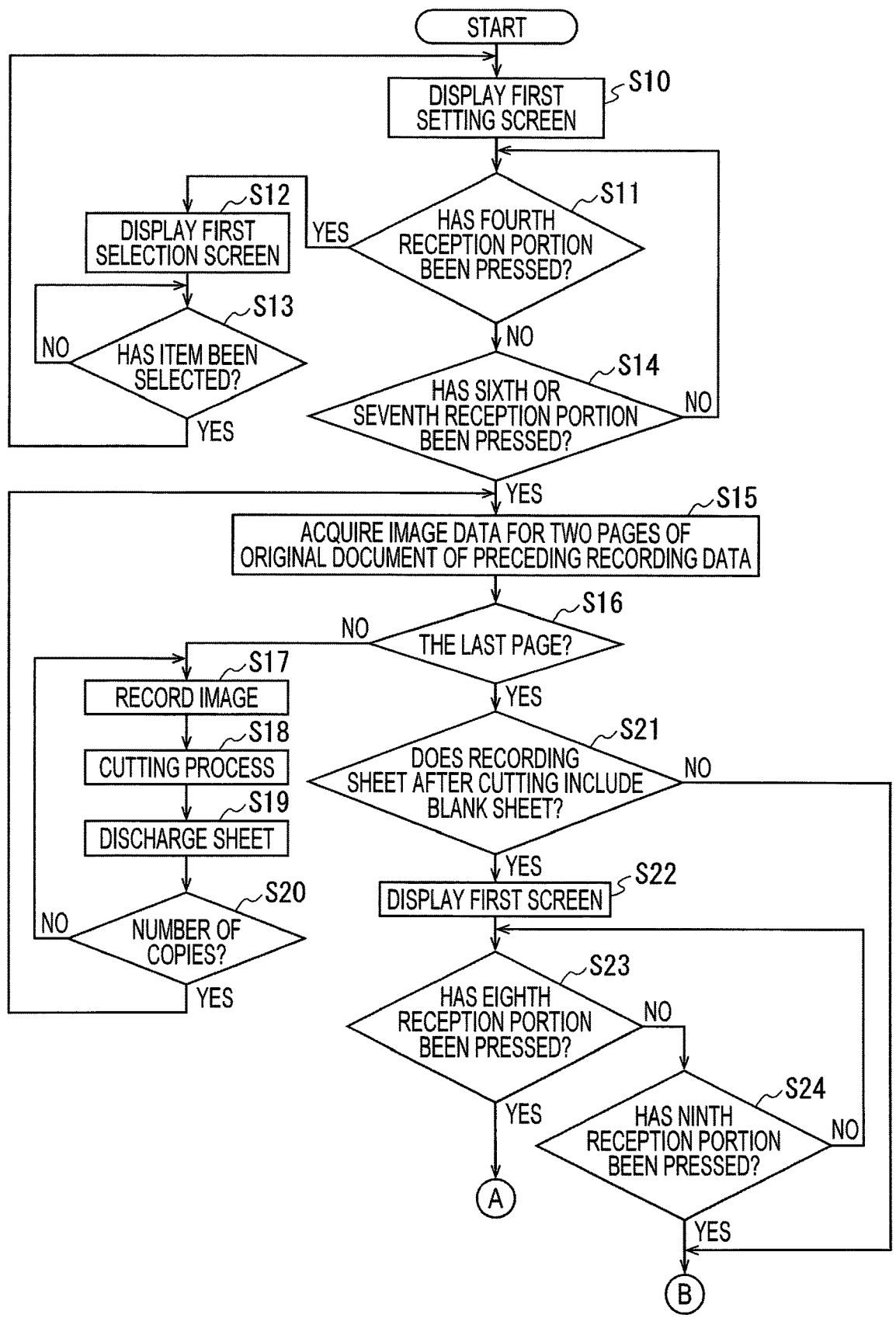
FIGS. 13A and 13B show a flowchart showing processes of displaying screens on the LCD 22 by a controller 100.
Figure 13B:
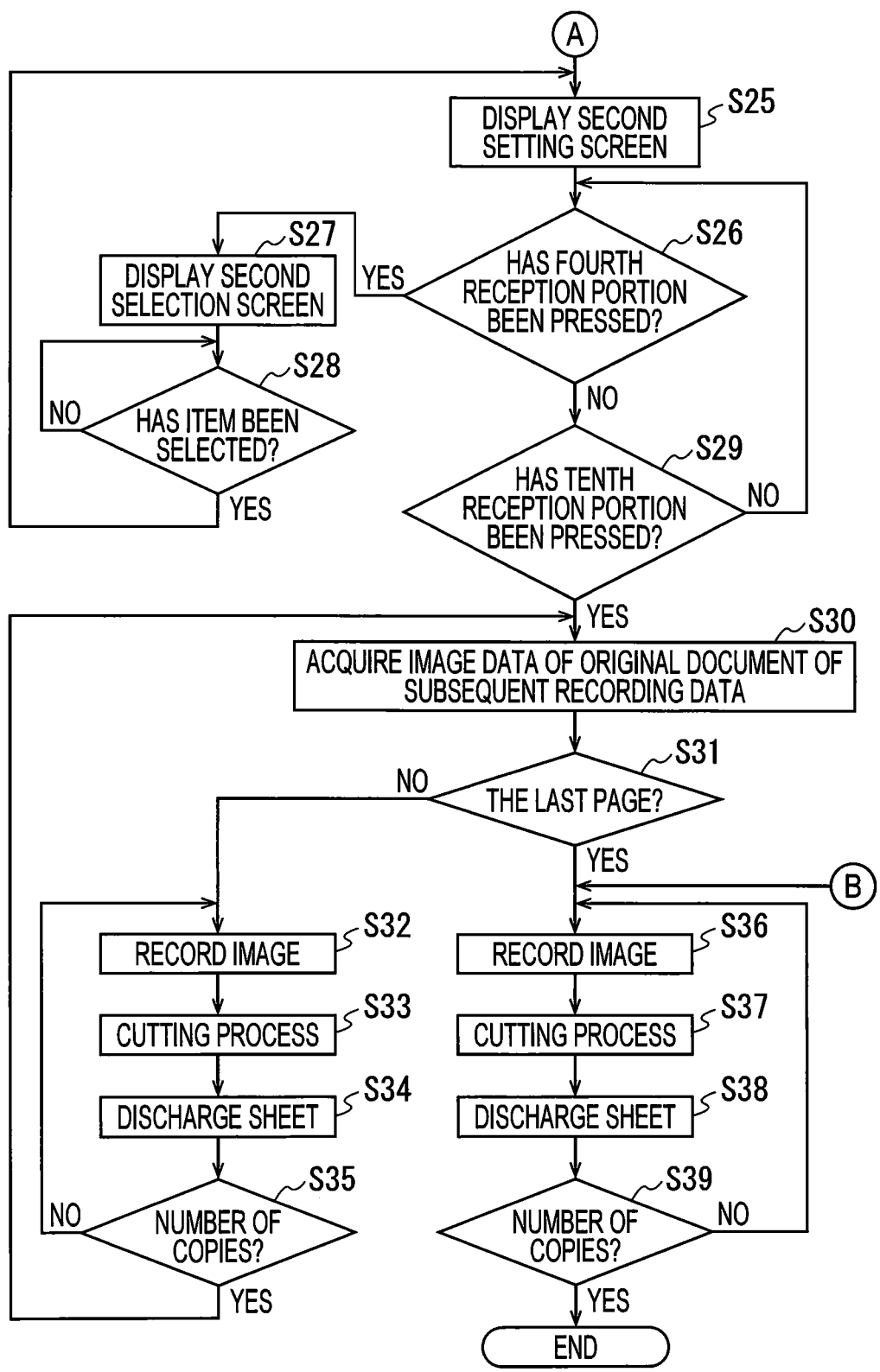

When the first reception portion 205 (cut copy) is selected by the user on the home screen 190, the controller 100 starts processing shown in FIGS. 13A and 13B. The controller 100 displays the first setting screen 191 shown in FIG. 8 on the LCD 22 (S10).

Figure 8:
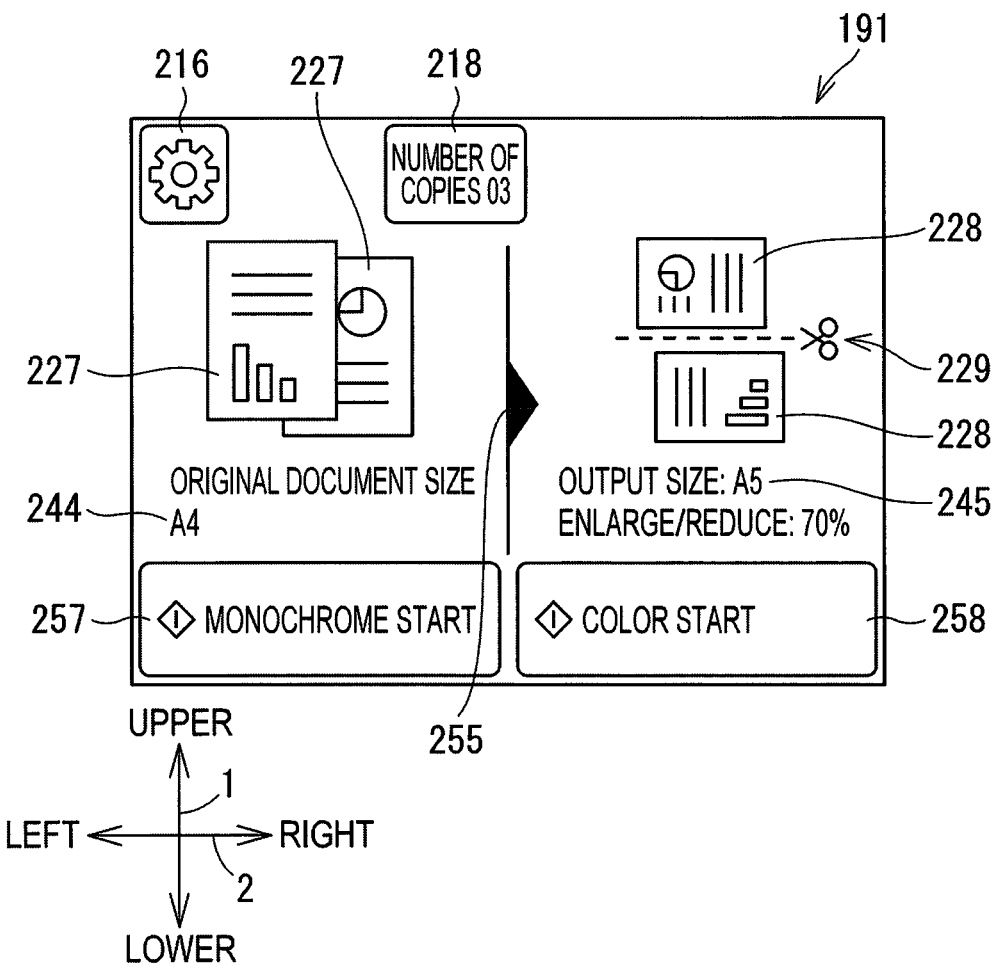
FIG. 8 shows a first setting screen 191 displayed on the LCD 22 of the image recording apparatus 10.

The first setting screen 191 is a screen displaying that the preceding recording data is subjected to the image recording process on the recording sheet 8, and the cutting process is executed. The first setting screen 191 is a screen showing, on the LCD 22, an image of the original document 9 to be subjected to the reading process and an image of the recording sheet 8 after cutting. The first setting screen 191 is displayed before the reading process, the image recording process, and the cutting process are executed. As shown in FIG. 8, the first setting screen 191 has a plurality of icons. The first setting screen 191 is divided substantially into four stages, that is, an uppermost stage, an upper stage, a lower stage, and a lowermost stage from the upper side to the lower side. The first setting screen 191 has a fourth reception portion 216 and a fifth reception portion 218 on the uppermost stage and has a first icon 227, a second icon 228, and a third icon 229 on the upper stage. The first setting screen 191 has a first size-information display 244 and a second size-information display 245 on the lower stage, and has a sixth reception portion 257 and a seventh reception portion 258 on the lowermost stage.

On the uppermost stage of the first setting screen 191, the fourth reception portion 216 and the fifth reception portion 218 are disposed from the left side toward the right side. The fourth reception portion 216 is shown by representing a shape of a gear and receives an instruction to display a first selection screen 192.

The fifth reception portion 218 receives an instruction to set the number of recording copies to be subjected to the image recording process. The fifth reception portion 218 further displays the characters "NUMBER OF COPIES" and the number of recording copies set by the user to the right of the characters. Suppose that "3 copies" is input in the fifth reception portion 218 in this embodiment. The controller 100 stores "3 copies", which is the input number of copies in the EEPROM 104.

The first icon 227 is disposed on the left side of the first setting screen 191, and the second icon 228 and the third icon 229 are disposed on the right side of the first setting screen 191.

The first icon 227 indicates the original document 9 to be subjected to the image recording process. The first sheet and the second sheet of the original document 9 are shown. That is, the first icon 227 shows an image of the first page and an image of the second page read from the original document 9. The first icon 227 displays the image of the first page and the image of the second page in a state where two vertically long rectangles are partially overlapped front and back on the first setting screen 191.

The second icon 228 is an icon displaying each recording sheet 8 which has been subjected to the cutting process in a state where two laterally long rectangles are separated up and down on the first setting screen 191.

The third icon 229 is located between the two rectangles of the second icon 228. The third icon 229 is shown by representing a shape of scissors.

The first setting screen 191 further has an eighth icon 255. The eighth icon 255 is an arrow from the first icon 227 toward the second icon 228. The eighth icon 255 is disposed at a center in the left-right direction 2 on the first setting screen 191. The eighth icon 255 is located across the upper stage to the lower stage of the first setting screen 191.

The first setting screen 191 has the sixth reception portion 257 and the seventh reception portion 258 for receiving the user's operation in order to start a first reading process for reading the preceding recording data, the image recording process, and the cutting process. The sixth reception portion 257 is located on the left side of the first setting screen 191, and the seventh reception portion 258 is located on the right side.

The sixth reception portion 257 is an icon displaying a diamond-shaped figure and characters "MONOCHROME START" and receives an instruction for executing the image recording process with monochrome images. When the user selects the sixth reception portion 257 and presses the enter button 19b, the first reading process, the image recording process, and the cutting process are started, and the images are recorded in monochrome.

The seventh reception portion 258 is an icon displaying a diamond-shaped figure and characters "COLOR START" and receives an instruction for executing the image recording process with color images. When the user selects the seventh reception portion 258 and presses the enter button 19b, the first reading process, the image recording process, and the cutting process are started, and the images are recorded in color.

Figure 9:
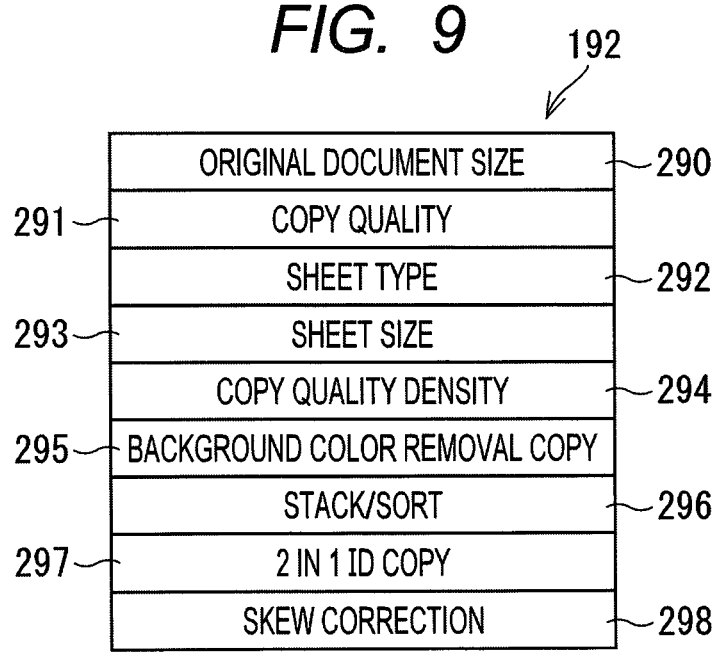
FIG. 9 shows a first selection screen 192 displayed on the LCD 22 of the image recording apparatus 10.

As shown in FIG. 13A, the controller 100 determines whether the fourth reception portion 216 has been pressed by the user on the first setting screen 191 (S11). In response to determining that the fourth reception portion 216 has been pressed on the first setting screen 191 (S11: Yes), the controller 100 displays the first selection screen 192 shown in FIG. 9 on the LCD 22 (S12).

The first selection screen 192 is a screen on which an original document size 290 and so on is set when the preceding recording data is to be recorded on the recording sheet 8. The first selection screen 192 has items of, in addition to the original document size 290, a copy quality 291, a sheet type 292, a sheet size 293, a copy quality density 294, a background color removal copy 295, a stack/sort 296, a 2-in-1 ID copy 297, a skew correction 298 and so on, and each item is displayed in a selectable manner. That is, each item is a condition settable in the image recording process based on the preceding recording data displayed by a pressing operation on the fourth reception portion 216 on the first setting screen 191. In this embodiment, in the stack/sort 296, stack printing is selected.

As shown in FIG. 13A, the controller 100 determines whether any one of the setting items such as the original document size 290 has been pressed on the first selection screen 192 (S13). In response to determining that none of the setting items has been selected on the first selection screen 192 (S13: No), the controller 100 determines whether the setting item has been pressed, until any one of the setting items is selected. In response to determining that any one of the setting items has been selected on the first selection screen 192 (S13: Yes), the controller 100 reflects the setting of the setting item and displays the first setting screen 191 (S10). When the setting item such as the original document size 290 has been pressed, a screen for selecting more detailed setting is displayed, but detailed explanation is omitted here. The first selection screen 192 may have a button to return to the first setting screen 191 without selecting the setting item.

When the original document size 290 has been selected, as shown in FIG. 8, in the first size-information display 244 located on the left side of the first setting screen 191, a size of the original document 9 is displayed together with and below characters "ORIGINAL DOCUMENT SIZE:". On the second size-information display 245 located on the right side, a size of the recording sheet 8 after cutting together with characters "OUTPUT SIZE:" and a value expressing a size of the recording sheet 8 after cutting of the original document 9 in scaling together with characters "ENLARGE/REDUCE:" are displayed.

For example, when the original document size 290 selected on the first selection screen 192 is A4 size, the original document size 290 of the first size-information display 244 displays "A4". When the sheet size selected on the first selection screen 192 is A5, the second size-information display 245 is displayed with an output size of "A5" and enlarge/reduce ratio of "70%". That is, it is set such that one sheet of the recording sheet 8 is divided into halves (two sheets) in the cutting process.

As shown in FIG. 13A, in response to determining that the fourth reception portion 216 has not been pressed on the first setting screen 191 at S11 (S11: No), the controller 100 determines whether either of the sixth reception portion 257 or the seventh reception portion 258 has been pressed (S14). In response to determining that neither the sixth reception portion 257 nor the seventh reception portion 258 has been pressed on the first setting screen 191 (S14: No), the controller 100 determines whether the fourth reception portion 216 has been pressed (S11). In response to determining that either one of the sixth reception portion 257 or the seventh reception portion 258 has been pressed on the first setting screen 191 (S14: Yes), the controller 100 starts the first reading process and acquires preceding recording data by the ADF12c (S15).

In this embodiment, as the reading process, the first reading process of reading an image of the preceding original document 9 by the scanner section 12 and generating the preceding recording data (an example of the first recording data) and second reading process of reading an image of the subsequent original document 9 and generating the subsequent recording data (an example of the third recording data) are executed. In the reading process, the image of the original document 9 is read. As shown in FIG. 4, the user places a plurality of original documents 9 on the ADF document tray 120 in a state where the surface with the image of the original document 9 recorded is faced down.

The controller 100 drives the LF conveyance motor 110 in response to the pressing on either of the sixth reception portion 257 or the seventh reception portion 258. When the LF conveyance motor 110 is driven and each of the rollers 164, 166, 168, and 171 of the conveyance mechanism 123 is driven, the original document 9 on the lowest position in the plurality of original documents 9 is conveyed from the ADF document tray 120.

The document sensor 91 detects a leading end of the original document 9 having been conveyed from the ADF document tray 120. The controller 100 conveys the original document 9 for a particular distance based on a detection signal of the document sensor 91 and then, starts the reading process by the CIS 85.

The original document 9 having passed the document sensor 91 is further guided by the positioning member 131 and reaches the first image-reading unit 84 and then, the image is read by the CIS 85. After the image is read, the leading end of the original document 9 is guided diagonally upward. The original document 9 is conveyed so as to be warped from the left to the right on the outer peripheral surface of the third roller 171.

The original document 9 is conveyed to the downstream of the conveyance direction 124 while being sandwiched by the third rollers 171, 172. The controller 100 conveys the original document 9 for which the image reading has finished for a particular distance and discharges the same to the ADF discharge tray 121.

In S15, the controller 100 reads the images of two pages of the original document 9. If there is only one page of the original document 9 to be read, the controller 100 reads the image for one page of the original document 9. Then, the controller 100 determines whether the last page is included in a read portion (scanned portion) of the original document 9 (S16). For example, if a document detection sensor is provided on the ADF document tray 120 of the scanner section 12, the controller 100 determines whether the last page is included based on whether the document detection sensor detects the original document 9. When a signal which detects the original document 9 is acquired from the document detection sensor, because the original document 9 remains in the ADF document tray 120, the controller 100 determines that the last page is not included in the read portion of the original document 9 (S16: No). When a signal which does not detect the original document 9 is acquired from the document detection sensor, since the original document 9 does not remain on the ADF document tray 120, the controller 100 determines that the last page is included in the read portion of the original document (S16: Yes).

In response to determining that the last page is not included in the read portion of the original document 9 (S16: No), the controller 100 executes the image recording process (S17) and the cutting process (S18).

The image recording process is processing in which the recording section 17 records an image on the recording sheet 8 based on the preceding recording data generated by reading the original document 9 by the first reading process. In the image recording process, the controller 100 executes the program 99 to execute a generation process for generating image data information for recording an image on the recording sheet 8 by the recording section 17. The controller 100 executes the program 99 to execute a transmission process for transmitting image data information from the controller 100 to the recording section 17.

In response to receiving the preceding recording data generated by the first reading process or the second reading process, the controller 100 drives the feed motor 113 to rotate the feed roller 32. As shown in FIG. 2, one sheet of the A4-size recording sheet 8 on the uppermost side is sent out from the sheet-feed cassette 15 to the conveyance path 21. The controller 100 drives the conveyance motor 116 to rotate the PF roller pair 25. As a result, the recording sheet 8 sent out from the sheet feed cassette 15 to the conveyance path 21 is conveyed by the PF roller pair 25 to below the recording head 37 and becomes a state supported by the platen 36 from below.

While conveyance of the recording sheet 8 is stopped, the controller 100 drives the carriage motor 115 and moves the carriage 35 in the left-right direction 2. At this time, ink is ejected from the recording head 37 toward the recording sheet 8. As a result, images for one pass are recorded on the recording sheet 8. The conveyance and stoppage of the recording sheet 8 are repeated, the images for a particular number of passes are recorded, and the image recording on the recording sheet 8 is finished. Here, recording of images for two sheets of the A5-size recording sheet is performed for an A4-size recording sheet 8. For example, the controller 100 reduces the size of the A4-size images read in the reading process to the A5-size and records the images on the recording sheet 8. When an image is to be recorded, the controller 100 drives the conveyance motor 116 to rotate the first discharge roller pair 27. As a result, the recording sheet 8 having passed the platen 36 is conveyed to below the cutter 45.

The cutting process is processing of cutting the recording sheet 8 which has been subjected to the image recording process by the cutter 45 at a center position in the conveyance direction. Hereinafter, a case in which an image of one sheet of the A4-size original document 9 is reduced to the A5-size, and the image is recorded on two sheets of the A5-size recording sheet 8 will be described. In the cutting process, the controller 100 executes the program 99 to execute a cutting-information generation process for generating sheet-cutting information for cutting the recording sheet 8 by the cutter 45 at the center position in the conveyance direction of the recording sheet 8 and executes a transmission process of transmitting the sheet-cutting information from the controller 100 to the cutter 45.

When the center in the conveyance direction of the recording sheet 8 is conveyed to below the cutter 45, the controller 100 drives the cutting motor 114 and rotates the drive pulley 92. As a result, a cutter carriage 82 moves from a stop position (position of the cutter 45 shown in FIG. 3) to the right along the guide rail 81. The A4-size recording sheet 8 is sandwiched by the rotary blade 83 and the fixed blade 95 at the center position in the conveyance direction and cut along the left-right direction 2, which makes two sheets of the A5-size recording sheet. The cut two sheets of A5-size recording sheet are discharged by the second discharge roller pair 28 from the conveyance path 21 to the sheet discharge tray 18 (S19).

When the image recording process, the cutting process, and the ejection processing of one sheet of the recording sheet 8 are finished, the controller 100 determines whether the image recording process (S17) has been executed for the number of copies stored in the EEPROM 104 (S20). In this embodiment, "3 copies" is stored in the EEPROM 104. Thus, the controller 100 executes the image recording process (S17) for the first copy and the second copy and then makes a negative determination in S20 (S20: No) and returns to the processing in S17. When the controller 100 determines in S20 that three copies have been reached, the controller 100 makes a positive determination in S20 (S20: Yes) and returns to the processing in S15.

As shown in FIG. 13A, in response to determining that the last page is included in the read portion of the original document 9 (S16: Yes), the controller 100 determines whether there is a blank sheet of the recording sheet 8 after recording and cutting based on the preceding recording data which has been read (S21). Here, the blank sheet means an unrecorded sheet on which an image can be recorded.

In the cutting process in this embodiment, since one sheet of the recording sheet 8 is cut into two sheets of the recording sheet 8, when the number of all the pages in the image recording based on the preceding recording data is an odd number, there will be a blank page of the recording sheet 8 after cutting. When the number of all the pages in the image recording based on the preceding recording data is an even number, there will be no blank page of the recording sheet 8 after cutting. In S15, images of two pages of the original document 9 are read, and if the original document 9 read in S15 is only one page, which is the last page, the number of pages of the original document 9 is an odd number, while if it is two pages including the last page, the number of pages of the original document 9 is an even number.

In response to determining that the recording sheet 8 after cutting does not include a blank sheet (S21: No), the controller 100 executes the image recording process (S36) and the cutting process (S37) based on the acquired preceding recording data, discharges the recording sheet after cutting to the sheet discharge tray 18 (S38), and determines whether the image recording process (S17) for the number of copies stored in the EEPROM 104 has been executed (S39). After executing the image recording process (S36) for the first copy and the second copy, the controller 100 makes a negative determination in S39 (S39: No) and returns to the processing in S36. After executing the image recording process for the third copy (S36), the controller 100 makes a positive determination in S39 (S39: Yes) and finishes a series of the reading process, the image recording process, and the cutting process.

In response to determining that the recording sheet 8 after cutting includes a blank sheet (S21: Yes), the controller 100 displays the first screen 194 on the LCD 22 (S22) without executing the image recording process based on the acquired preceding recording data.

Figure 10:
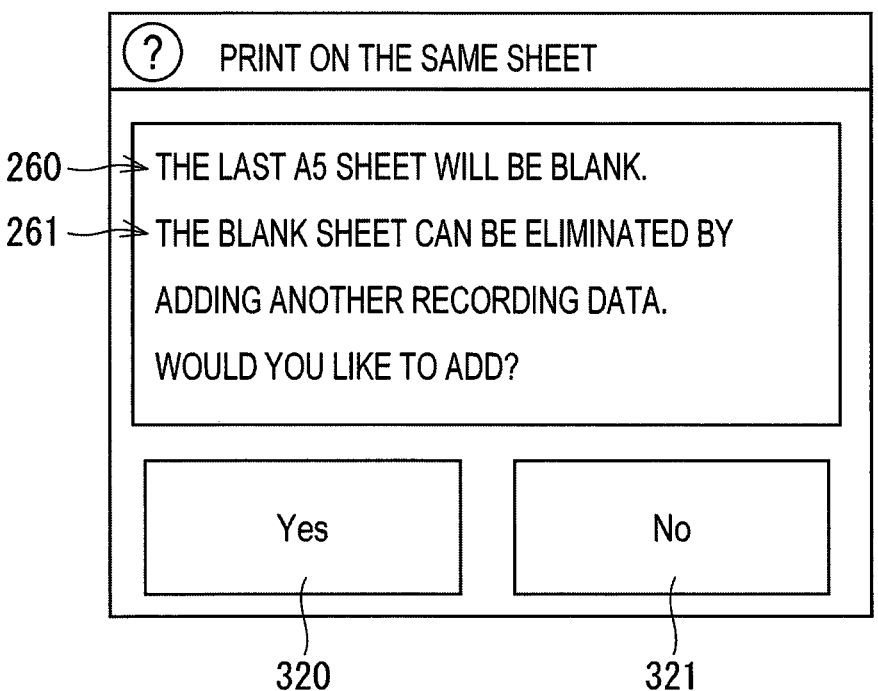
FIG. 10 shows a first screen 194 displayed on the LCD 22 of the image recording apparatus 10.
Figure 10:
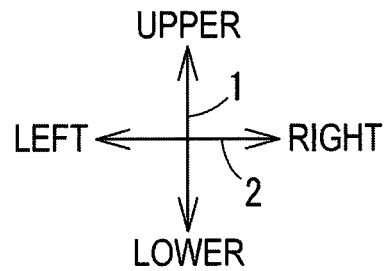

As shown in FIG. 10, the first screen 194 is a screen displaying that the sheet cut by the cutting process on the recording sheet 8 includes a blank sheet and is also a screen displaying that the blank sheet is usable by adding another recording data. On the first screen 194, a remain message (an example of a first object) 260 and an addition message (an example of a fifth object and an addition inquiry object) 261 are displayed (an example of display process). The first screen 194 has an eighth reception portion 320 (an example of a sixth object and a scan addition object) and a ninth reception portion 321.

The remain message 260 is displayed at the center in the upper-lower direction 1 of the first screen 194. The remain message 260 is a message displayed with characters "The last A5 sheet will be blank."

The addition message 261 is characters continuing to the remain message 260 displayed at the center in the upper-lower direction 1 of the first screen 194. The addition message 261 is a message displayed with characters "The blank sheet can be eliminated by adding another recording data. Would you like to add?".

The eighth reception portion 320 receives an instruction for executing the image recording process by adding subsequent recording data in accordance with the addition message 261. The eighth reception portion 320 is an icon on which characters "Yes" are displayed. The eighth reception portion 320 is disposed on a lower side of the first screen 194. The eighth reception portion 320 is located on the left side of the first screen 194.

The ninth reception portion 321 receives an instruction for executing the image recording process without adding the subsequent recording data not in accordance with the addition message 261. The ninth reception portion 321 is an icon on which characters "No" are displayed. The ninth reception portion 321 is disposed on the right of the eighth reception portion 320 on the lower side of the first screen 194.

On the first screen 194, since the remain message 260 and the addition message 261 are displayed, the user is notified that the recording sheet 8 after cutting will include a blank sheet (surplus sheet) and that the surplus sheet is solved by adding the subsequent recording data. This enables the user to make a selection on the first screen 194 whether to execute the image recording process and the cutting process by including the subsequent recording data (no blank sheet remains) or to execute the image recording process and the cutting process based on the preceding recording data with the recording sheet 8 after cutting remaining (a blank sheet remains).

As shown in FIG. 13A, the controller 100 determines on the first screen 194 whether the eighth reception portion 320 has been pressed (S23). In response to determining that the eighth reception portion 320 has not been pressed (S23: No), the controller 100 determines whether the ninth reception portion 321 has been pressed on the first screen 194 (S24). In response to determining that the ninth reception portion 321 has not been pressed (S24: No), the controller 100 returns to S23.

In response to determining that the ninth reception portion has been pressed (S24: Yes), the controller 100 executes the image recording process (S36) and the cutting process (S37) based on the preceding recording data, causes the recording sheet after cutting to be discharged to the sheet discharge tray (S38), and determines whether the image recording process (S17) for the number of copies stored in the EEPROM 104 has been executed (S39). After executing the image recording process (S36) for the first copy and the second copy, the controller 100 makes a negative determination in S39 (S39: No) and returns to the processing in S36. After executing the image recording process (S36) for the third copy, the controller 100 makes a positive determination in S39 (S39: Yes) and finishes a series of the reading process, the image recording process, and the cutting process.

In response to determining that the eighth reception portion 320 has been pressed in S20 (S23: Yes), as shown in FIG. 13B, the controller 100 displays a second setting screen 195 on the LCD 22 (S25).

Figure 11:
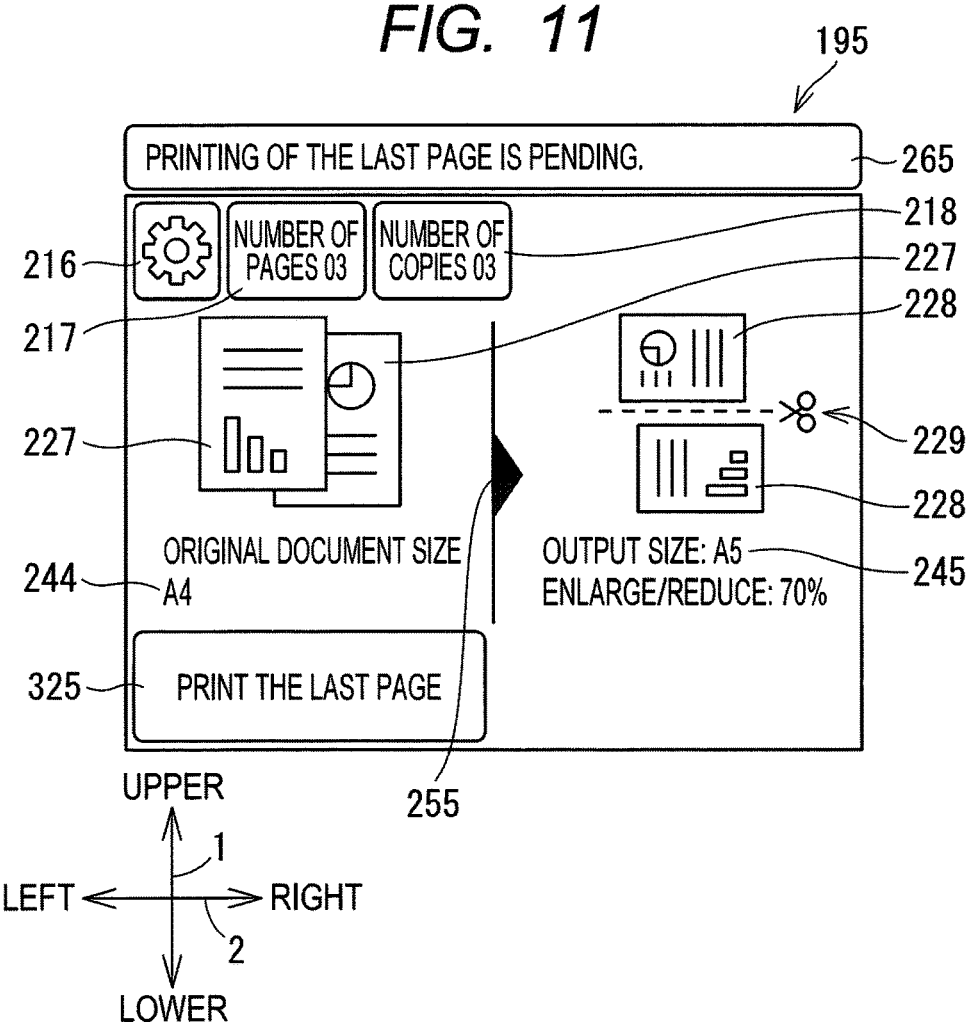
FIG. 11 shows a second setting screen 195 displayed on the LCD 22 of the image recording apparatus 10.

The second setting screen 195 is a screen which displays that the image recording process is executed for the subsequent recording data on the recording sheet 8, and the cutting process is executed. As shown in FIG. 11, the second setting screen 195 is different from the first setting screen 191 and has a pending message 265, a counter 217, and a tenth reception portion 325. In the second setting screen 195, the same signs are given to parts similar to those in the first setting screen 191, and description thereof will be omitted.

The pending message 265 is disposed above the fourth reception portion 216 of the second setting screen 195. The pending message 265 is a message displaying that the cut sheets by executing the cutting process of the recording sheet 8 include a blank sheet and displaying characters that "Printing of the last page is pending."

When the sixth reception portion 257 or the seventh reception portion 258 has been pressed, and the first reading process of the preceding recording data is started, the counter 217 displays the number of pages of the original document 9 that has been read by the ADF 12c on the right of the characters "NUMBER OF PAGES."

The tenth reception portion 325 is an icon displaying characters "PRINT THE LAST PAGE" and receives instructions to start the image recording process of the last page of the preceding recording data and the image recording process of the subsequent recording data. The tenth reception portion 325 is located on the left side of the lowermost stage of the second setting screen 195. That is, on the second setting screen 195, the tenth reception portion 325 is disposed instead at the position of the eighth reception portion 320 on the first setting screen 191.

As shown in FIG. 13B, the controller 100 determines whether the fourth reception portion 216 has been pressed by the user on the second setting screen 195 (S26). In response to determining that the fourth reception portion 216 has been pressed on the second setting screen 195 (S26: Yes), the controller 100 displays the second selection screen 196 shown in FIG. 12 on the LCD 22 (S27).

Figure 12:
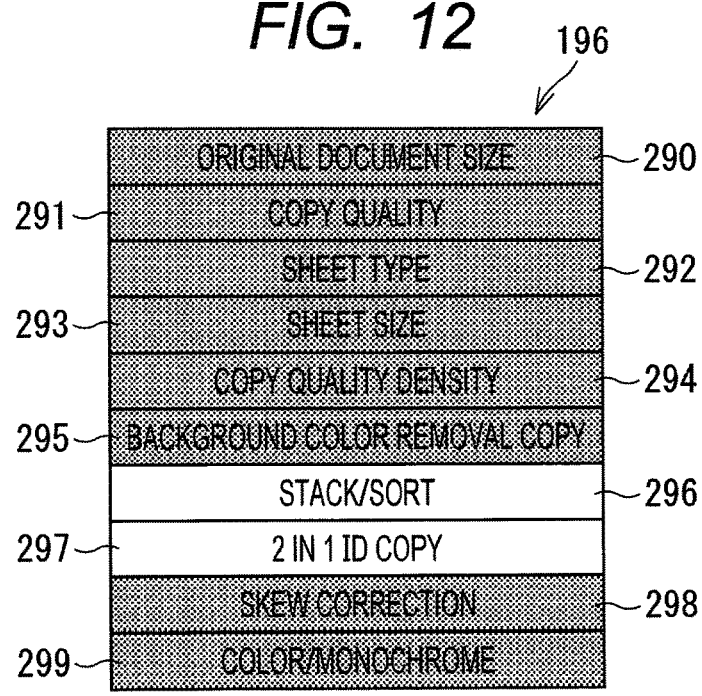
FIG. 12 shows a second selection screen 196 displayed on the LCD 22 of the image recording apparatus 10.

As shown in FIG. 12, the second selection screen 196 is a screen for setting the original document size 290 and so on, when the subsequent recording data is to be recorded on the recording sheet 8. The second selection screen 196 has each of the items of the original document size 290, the copy quality 291, the sheet type 292, the sheet size 293, the copy quality density 294, the background color removal copy 295, the stack/sort 296, the 2-in-1 ID copy 297, the skew correction 298, and the color/monochrome 299.

On the second selection screen 196, for example, each of the items of the stack/sort 296 and the 2-in-1 ID copy 297 is displayed in a selectable manner, while selection of each of the items of the original document size 290, the copy quality 291, the sheet type 292, the sheet size 293, the copy quality density 294, the background color removal copy 295, the skew correction 298, and the color/monochrome 299 is limited, and displayed in a gray-out state. The items displayed in the gray-out state are items whose settings are not changeable in the image recording process of the subsequent recording data because the items have been already set on the first selection screen 192.

For example, the original document size 290, which is the size of the recording sheet 8, the sheet size 293, which is the size of the recording sheet after cutting, and the sheet type 292, which is a type of the sheet of the recording sheet 8 are not selectable, since the last page of the preceding recording data and the first page of the subsequent recording data are recorded on the same recording sheet 8. Thus, each of these items is grayed out. In the case of the setting related to the image recording process such as the copy quality 291, the copy quality density 294, the background color removal copy 295, the skew correction 298, the color/monochrome 299 and so on, since the last page of the preceding recording data and the first page of the subsequent recording data are recorded on the same recording sheet 8, it is difficult to execute the image recording process different from the image recording process executed on a part of the recording sheet 8 unless special processing is performed on another part. Thus, each of these items is grayed out. However, if the program 99 capable of executing the special processing is included, these items may not be grayed out but may be displayed in a selectable manner. That is, in the case of the image recording apparatus 10 capable of the image recording process executed on another part of the recording sheet 8, different from the image recording process executed on a part of the recording sheet 8, the control may be such that the settings described above are changeable. Regarding the 2-in-1 ID copy 297 recording two pages of images on the sheet after cutting of the recording sheet 8 and the stack/sort 296 which switches between the stack printing and the sort printing, the change is possible and displayed in a selectable manner. In the following description, it is assumed that the stack printing has been selected on the second selection screen 196.

As shown in FIG. 13B, the controller 100 determines whether any one of the setting items has been pressed on the second selection screen 196 (S28). In response to determining that none of the setting items has been selected on the second selection screen 196 (S28: No), the controller 100 determines whether the setting item has been pressed, until any one of the setting items is selected. In response to determining that any one of the setting items has been selected on the second selection screen 196 (S28: Yes), the controller 100 reflects the setting of the setting item and displays the second setting screen 195 (S25). Here, if the setting item such as the stack/sort 296 has been pressed on the second selection screen 196, a screen for selecting more detailed settings is displayed, but detailed explanation is omitted here. The second selection screen 196 may have a button to return to the second setting screen 195 without selecting the setting item.

In response to determining that the fourth reception portion 216 has not been pressed on the second setting screen 195 in S26 (S26: No), the controller 100 determines whether the tenth reception portion 325 has been pressed (S29). In response to determining that the tenth reception portion 325 has not been pressed on the second setting screen 195 (S29: No), the controller 100 returns to S26. In response to determining that the tenth reception portion 325 has been pressed on the second setting screen 195 (S29: Yes), the controller 100 starts the second reading process and acquires the subsequent recording data by the ADF 12c (S30). Here, the details when the subsequent recording data is acquired will be described. When acquiring the first subsequent recording data after the tenth reception portion 325 has been pressed, one page of the subsequent recording data is acquired. This is because a blank sheet will be generated when the last page of the preceding recording data is printed. After that, two pages of the subsequent recording data are acquired.

The controller 100 determines whether the last page is included in the read image (S31). In response to determining that the last page is not included in the read image (S31: No), the controller 100 executes the image recording on one sheet of the recording sheet 8 for the image on the last page already read in S17 and for the image on the first page of the subsequent recording data (S32), cuts the recording sheet 8 (S33) and then discharges the cut sheets to the sheet discharge tray 18 (S34) and determines whether the image recording process (S32) for the number of copies stored in the EEPROM 104 has been executed (S35). When the controller 100 executes the image recording process (S32) for the first copy and the second copy, the controller 100 makes a negative determination in S35 (S35: No) and returns to the processing in S32. After the controller 100 executes the image recording process (S32) for the third copy, the controller 100 makes a positive determination in S35 (S35: Yes) and returns to the processing in S30. In the image recording (S32), the last page of the preceding recording data and the first page of the subsequent recording data are recorded on one sheet of the recording sheet 8 in the first image recording. In the second image recording and thereafter, the controller 100 records data for two pages of the subsequent recording data on one sheet of the recording sheet 8.

Similarly, if the last page is not included (S31: No), the controller 100 repeatedly executes the image reading of the original document 9 in S30. In response to determining that the last page is included (S31: Yes), the controller 100 executes the image recording process based on the subsequent recording data including the last page (S36), executes the cutting process (S37) and then determines whether the image recording process (S36) for the number of copies stored in the EEPROM 104 has been executed (S39). After the controller 100 executes the image recording process (S36) for the first copy and the second copy, the controller 100 makes a negative determination in S39 (S39: No) and returns to the processing in S36. After the controller 100 executes the image recording process (S36) for the third copy, the controller 100 makes a positive determination in S39 (S39: Yes) and finishes the series of the reading process, the image recording process, and the cutting process.

[Operations and Effects of Embodiment]

According to the image recording apparatus 10, in a case where the cutting process of the recording sheet 8 is executed, the LCD 22 displays that a blank sheet (on which an image can be recorded) of the recording sheet 8 after cutting will be left. The user notices that the recording sheet 8 will include a blank sheet after cutting before the data for the image recording is recorded on the recording sheet 8. Thus, by executing the image reading of the subsequent recording data so that a blank sheet of the recording sheet 8 after cutting is not left, an occurrence of a blank sheet of the recording sheet 8 after cutting is suppressed.

When the image recording process of the preceding recording data with settings set on the first setting screen 191 is to be executed, a blank sheet after cutting without an image recorded may be left. At this time, the user can select addition of the subsequent recording data by the eighth reception portion 320 and perform the settings of the subsequent recording data on the second setting screen 195. Here, the preceding recording data and the subsequent recording data are recorded by sharing one recording sheet 8 before cutting. Thus, if the setting of the subsequent recording data set on the second setting screen 195 is a non-executable setting due to the setting of the preceding recording data set on the first setting screen 191 (setting of the change of the sheet size 293 or the sheet material, for example), contradiction occurs, which leads to an error. So as to prevent such a contradicted setting, in the setting on the second setting screen 195, some settings are limited depending on the settings on the first setting screen 191. This enables the user to accurately recognize the items that can be set when the subsequent recording data is recorded on the recording sheet 8 after cutting, which is left in the recording of the preceding recording data. This enables smooth settings on the second setting screen 195.

The user selects addition of the subsequent recording data by the eighth reception portion 320 when the recording sheet 8 after cutting includes a blank sheet. This enables the user to record the subsequent recording data on the recording sheet 8 after cutting on which the recording is not performed, which suppresses generation of a blank sheet (surplus sheet) of the recording sheet 8 after cutting.

The controller 100 displays the remain message 260 (first object) after starting the image recording process and before discharging a blank sheet (surplus sheet). Because the user checks the display after starting the image recording process, the image recording process can be started promptly. Further, by checking the display before the blank sheet is discharged, the user can take measures such as adding recording data so that there is no blank sheet after cutting on which image recording can be performed. This suppresses generation of a blank sheet after cutting on which image recording has not been performed.

[Modification 1]

In the embodiment described above, as an example, the first screen 194 displaying the remain message 260 is displayed on the LCD 22 after start of the image recording process and before discharge of the recording sheet 8 for the last page, but the present disclosure is not limited thereto. The first screen 194 may be displayed after the preceding recording data is acquired and before start of the image recording process and the cutting process. For example, in a modification 1, so-called sort printing in which the image recording process and the cutting process are executed after reading of all the pages of the original document 8 has been performed in the reading process.

Figure 17A:
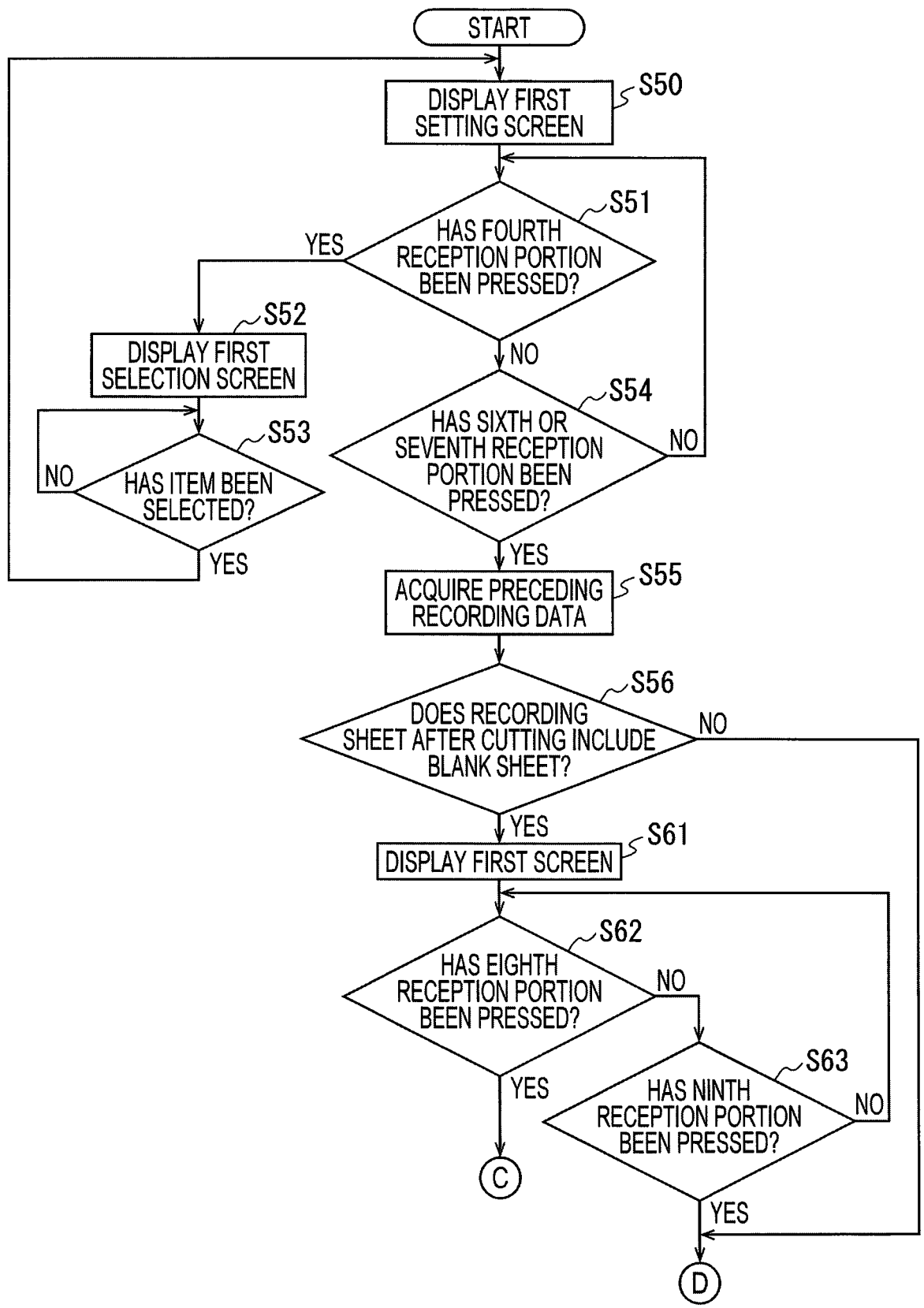
FIGS. 17A and 17B show a flowchart showing processes of displaying screens on the LCD 22 by the controller 100.

As shown in FIG. 17A, when the power is turned on by the user, the home screen 190 is displayed on the LCD 22. When the first reception portion 205 is selected by the user on the home screen 190, the first setting screen 191 is displayed on the LCD 22 (S50). Here, in the modification 1, it is assumed that "3 copies" is input in the fifth reception portion 218 on the first setting screen 191. The controller 100 stores "3 copies", which is the input number of copies, in the EEPROM 104.

The controller 100 determines whether the fourth reception portion 216 has been pressed by the user on the first setting screen 191 (S51). In response to determining that the fourth reception portion 216 has been pressed on the first setting screen 191 (S51: Yes), the controller 100 displays the first selection screen 192 on the LCD 22 (S52). Subsequently, the controller 100 determines whether any one of the setting items such as the original document size 290 has been pressed on the first selection screen 192 (S53). In response to determining that none of the setting items has been selected on the first selection screen 192 (S53: No), the controller 100 determines whether a setting item has been pressed until any one of the setting items is selected. In response to determining that any one of the setting items has been selected on the first selection screen 192 (S53: Yes), the controller 100 reflects the setting of the setting item and displays the first setting screen 191 (S50).

In the modification 1, the sort printing is selected in the stack/sort 296 on the first selection screen 192. The sort printing is printing in which the recording sheets 8 subjected to the image recording process are aligned and discharged in order of pages from the first page to the last page copy by copy. In the sort printing, the labor of the user for realigning the discharged recording sheet 8 in the order of pages is saved. In the image recording apparatus 10 in which sheets are discharged with face-up, the image recording is started from the last page of the original document 9 one by one. In more detail, a plurality of elements such as a state of setting of the original document 9 on the ADF document tray 120, a sheet-ejection method of the image recording apparatus 10 (face-up/face-down), presence/absence of a conveyance path for duplex printing, whether it is duplex printing, whether a plural number of copies is selected and so on are concerned, but detailed explanation here is omitted. In this modification 1, an example in which the image recording process is started after the reading process of all the original documents 9 is finished will be described.

When the controller 100 determines in S51 that the fourth reception portion 216 has not been pressed on the first setting screen 191 (S51: No), the controller 100 determines whether either one of the sixth reception portion 257 or the seventh reception portion 258 has been pressed (S54). In response to determining that neither the sixth reception portion 257 nor the seventh reception portion 258 has been pressed on the first setting screen 191 (S54: No), the controller 100 returns to S51. In response to determining that either one of the sixth reception portion 257 or the seventh reception portion 258 has been pressed on the first setting screen 191 (S54: Yes), the controller 100 starts the first reading process and acquires the preceding recording data by the ADF 12*c* (S55). In the modification 1, since the sort printing is set, the controller 100 acquires the data of all the original documents 9 as the preceding recording data in S55.

Figure 17B:
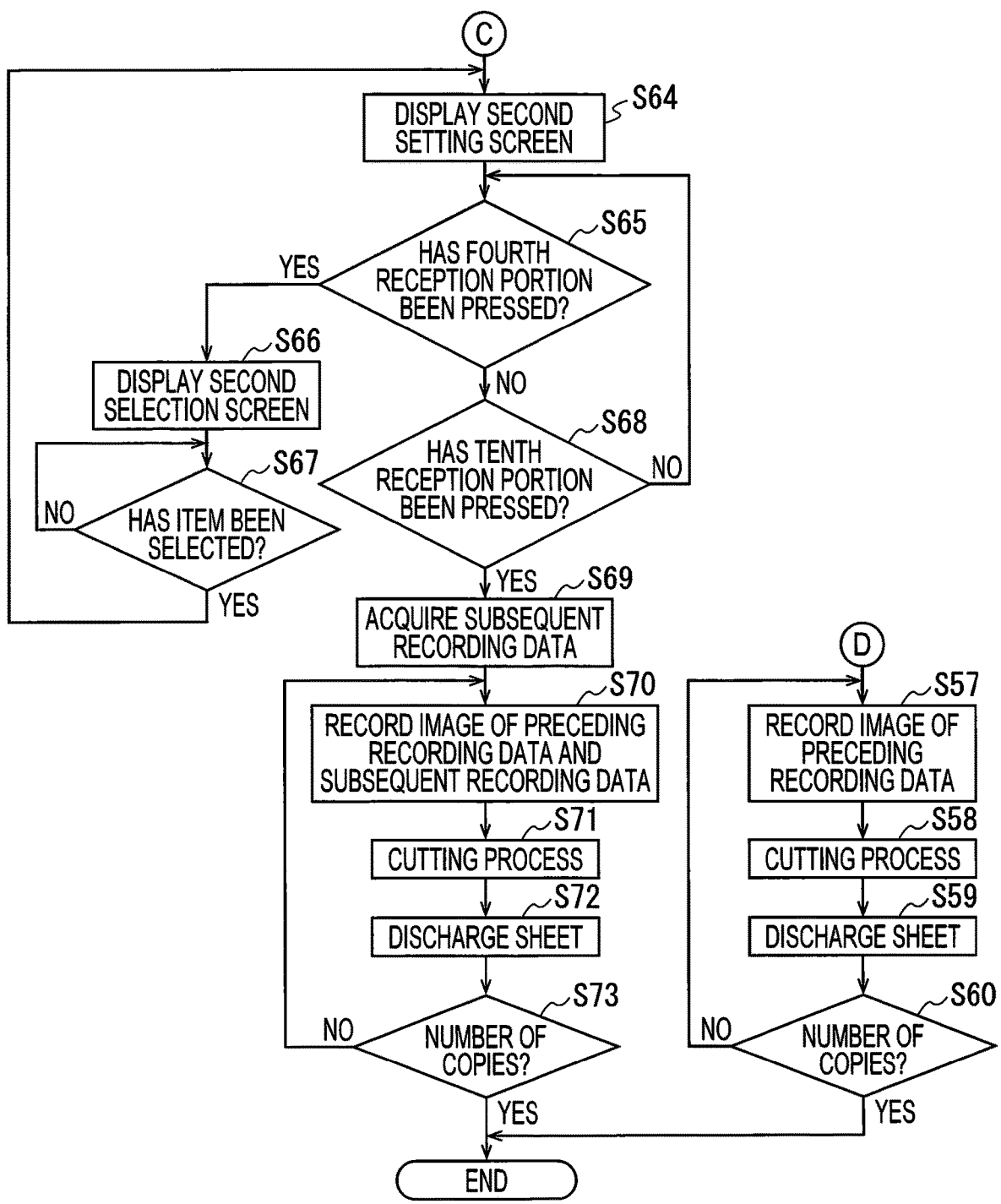

The controller 100 determines whether the recording sheet 8 after cutting will include a blank sheet, based on the acquired preceding recording data (S56). In the cutting process in the modification 1, since one sheet of the recording sheet 8 is cut into two sheets of the recording sheet 8, if the number of all the pages at the image recording based on the preceding recording data is an odd number, the recording sheet 8 after cutting includes a blank sheet. When the number of all the pages at the image recording based on the preceding recording data is an even number, the recording sheet 8 after cutting does not include a blank sheet. In response to determining that the recording sheet 8 after cutting will not include a blank sheet (S56: No), as shown in FIG. 17B, the controller 100 executes the image recording process based on the acquired preceding recording data (S57). After the image recording process, the controller 100 executes the cutting process (S58) and then, discharges the sheets to the sheet discharge tray 18 (S59), and determines whether the image recording process (S57) for the number of copies stored in the EEPROM 104 has been executed (S60). After executing the image recording process (S57) for the first copy and the second copy, the controller 100 makes a negative determination in S60 (S60: No) and returns to the processing in S57. After executing the image recording process (S57) for the third copy, the controller 100 makes a positive determination in S60 (S60: Yes) and finishes the series of the reading process, the image recording process, and the cutting process.

In response to determining that the recording sheet 8 after cutting will include a blank sheet (S56: Yes), the controller 100 displays the first screen 194 on the LCD 22 (S61). Since the remain message 260 and the addition message 261 are displayed on the first screen 194, the user is notified that the recording sheet 8 after cutting will include a blank sheet and that subsequent recording data may be added before starting the image recording process. This enables the user to select on the first screen 194 whether to add the subsequent recording data or to perform the image recording process and the cutting process only with the preceding recording data while leaving a blank sheet of the recording sheet 8 after cutting.

The controller 100 determines whether the eighth reception portion 320 has been pressed on the first screen 194 (S62). In response to determining that the eighth reception portion 320 has not been pressed (S62: No), the controller 100 determines whether the ninth reception portion 321 has been pressed on the first screen 194 (S63). In response to determining that the ninth reception portion 321 has not been pressed (S63: No), the controller 100 returns to S62.

In response to determining that the ninth reception portion has been pressed (S63: Yes), as shown in FIG. 17B, the controller 100 executes processing in S57 to S60 and finishes the series of the reading process, the image recording process, and the cutting process.

In response to determining that the eighth reception portion 320 has been pressed in S62 (S62: Yes), as shown in FIG. 17B, the controller 100 displays the second setting screen 195 on the LCD 22 (S64).

The controller 100 determines whether the fourth reception portion 216 has been pressed by the user on the second setting screen 195 (S65). In response to determining that the fourth reception portion 216 has been pressed on the second setting screen 195 (S65: Yes), the controller 100 displays the second selection screen 196 on the LCD 22 (S66). On the second selection screen 196, similarly to the embodiment, the items which are not settable in the image recording process of the subsequent recording data are grayed out, and selection is limited. The controller 100 determines whether any one of the setting items has been pressed on the second selection screen 196 (S67). In response to determining that none of the setting items has been selected on the second selection screen 196 (S67: No), the controller 100 determines whether a setting item has been pressed until any one of the setting items is selected. In response to determining that any one of the setting items has been selected on the second selection screen 196 (S67: Yes), the controller 100 reflects the setting of the setting item and displays the second setting screen 195 (S64). In the following description, it is assumed that the sort printing has been selected on the second selection screen 196.

In response to determining that the fourth reception portion 216 has not been pressed on the second setting screen 195 in S65 (S65: No), the controller 100 determines whether the tenth reception portion 325 has been pressed (S68). In response to determining that the tenth reception portion 325 has not been pressed on the second setting screen 195 (S68: No), the controller 100 determines whether the fourth reception portion 216 has been pressed (S65). In response to determining that the tenth reception portion 325 has been pressed on the second setting screen 195 (S68: Yes), the controller 100 starts the second reading process and acquires the subsequent recording data by the ADF 12*c* (S69).

The controller 100 executes the image recording process based on at least either the acquired preceding recording data or the subsequent recording data for one sheet of the recording sheet 8 (S70), executes the cutting process (S71) and then, discharges the sheets to the sheet discharge tray 18

(S72), and determines whether the image recording process (S70) has been executed for the number of copies stored in the EEPROM 104 (S73). After executing the image recording process (S70) for the first copy and the second copy, the controller 100 makes a negative determination in S73 (S73: No) and returns to the processing in S70. After executing the image recording process (S70) for the third copy, the controller 100 makes a positive determination in S73 (S73: Yes) and finishes the series of the reading process, the image recording process, and the cutting process.

The processing in S70 to S73 will be described in detail. For example, in a case where three copies of three-page preceding recording data and three copies of three-page subsequent recording data are set, two pages of the original document 9 are recorded on each of nine recording sheets 8 and each sheet is cut, and 18 sheets in total are discharged to the sheet discharge tray 18 with face-up. In detail, the third page and the second page of the preceding recording data are recorded on the first recording sheet 8, the first page and the third page of the preceding recording data are recorded on the second recording sheet 8, the second page and the first page of the preceding recording data are recorded on the third recording sheet 8, the third page and the second page of the preceding recording data are recorded on the fourth recording sheet 8, and the first page of the preceding recording data and the third page of the subsequent recording data are recorded on the fifth recording sheet 8. After that, the second page and the first page of the subsequent recording data are recorded on the sixth recording sheet 8, the third page and the second page of the subsequent recording data are recorded on the seventh recording sheet 8, the first page and the third page of the subsequent recording data are recorded on the eighth recording sheet 8, and the second page and the first page of the subsequent recording data are recorded on the ninth recording sheet 8. In the sheet discharge tray 18, the three copies of the preceding recording data and the three copies of the subsequent recording data are stacked in a sorted state. In this case, no blank sheet is generated after cutting.

In contrast, for example, in a case where three copies of three-page preceding recording data and two copies of three-page subsequent recording data are set, a blank sheet (surplus sheet) is generated after cutting. In this case, the controller 100 may, without recording the first page of the subsequent recording data on the eighth recording sheet 8, determine in S56 that a blank sheet will be generated (S56: Yes), display the first screen 194 (S61) and execute the subsequent control flow. That is, the controller 100 may execute control such that further subsequent recording data is added to the subsequent recording data. In this case, the recording data can be added until no blank sheet after cutting is generated.

[Operations and Effects of Modification 1]

According to the modification 1, when the cutting process of the recording sheet 8 is executed, the user checks the display of the remain message 260 on the first screen 194 before starting the image recording process and the cutting process and selects whether to add the reading of another original document. This enables the user to change settings such that no blank sheet is left after cutting, including a setting that cannot be changed after image recording is started. Thus, generation of a sheet without image recording after cutting is suppressed.

[Modification 2]

In the embodiment and the modification 1 above, by executing the image recording process based on the subsequent recording data on the recording sheet 8 without image recorded after cutting, generation of the recording sheet 8 without image recorded after cutting is suppressed, but the present disclosure is not limited thereto.

In the image recording process based on the preceding recording data, the image recording apparatus 10 may change the number of copies to be recorded based on the preceding recording data so that no blank sheet after cutting will be left. That is, the image recording apparatus 10 may change the setting in the image recording process based on the preceding recording data, and perform the image recording process based on new image recording data (an example of second recording data).

Figure 14:
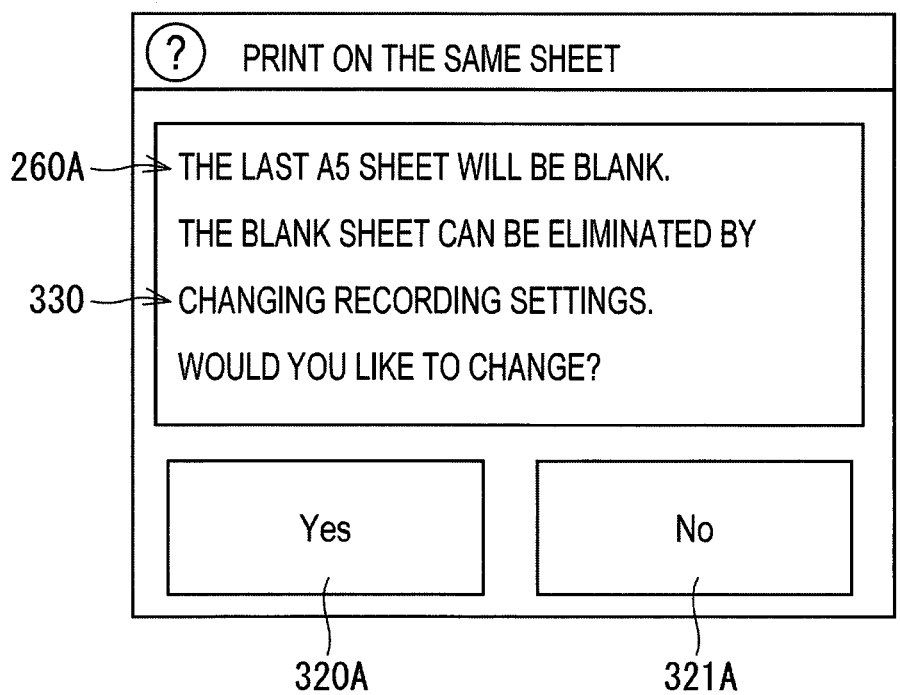
FIG. 14 shows a first screen 194A displayed on the LCD 22 of the image recording apparatus 10.

Specifically, the controller 100 acquires the preceding recording data and then, displays a first screen 194A shown in FIG. 14 instead of the first screen 194 displayed in S22 and S61. On the first screen 194A, as characters subsequent to a remain message 260A, a setting change message (an example of a second object) 330 is displayed. The setting change message 330 is a message displayed with characters "The blank sheet can be eliminated by changing recording settings. Would you like to change?". The other configurations of the first screen 194A are similar to those of the above-described embodiment.

The first screen 194A has an eighth reception portion (an example of a third object) 320A which receives an instruction to execute the setting change in accordance with the setting change message 330 and then to execute the image recording process, and a ninth reception portion 321A which receives an instruction to execute the image recording process without a setting change by not following the setting change message 330.

In the above-described embodiment and the modification 1, the preceding recording data and the subsequent recording data are acquired by the reading process using the scanner section 12, but this disclosure is not limited thereto. At least the preceding recording data or the subsequent recording data may be read from various types of storage mediums such as a USB memory or data stored in an external information apparatus such as a personal computer, for example. In such a case, the controller 100 determines the number of all the pages by acquisition of data without executing the reading process.

Figure 15:
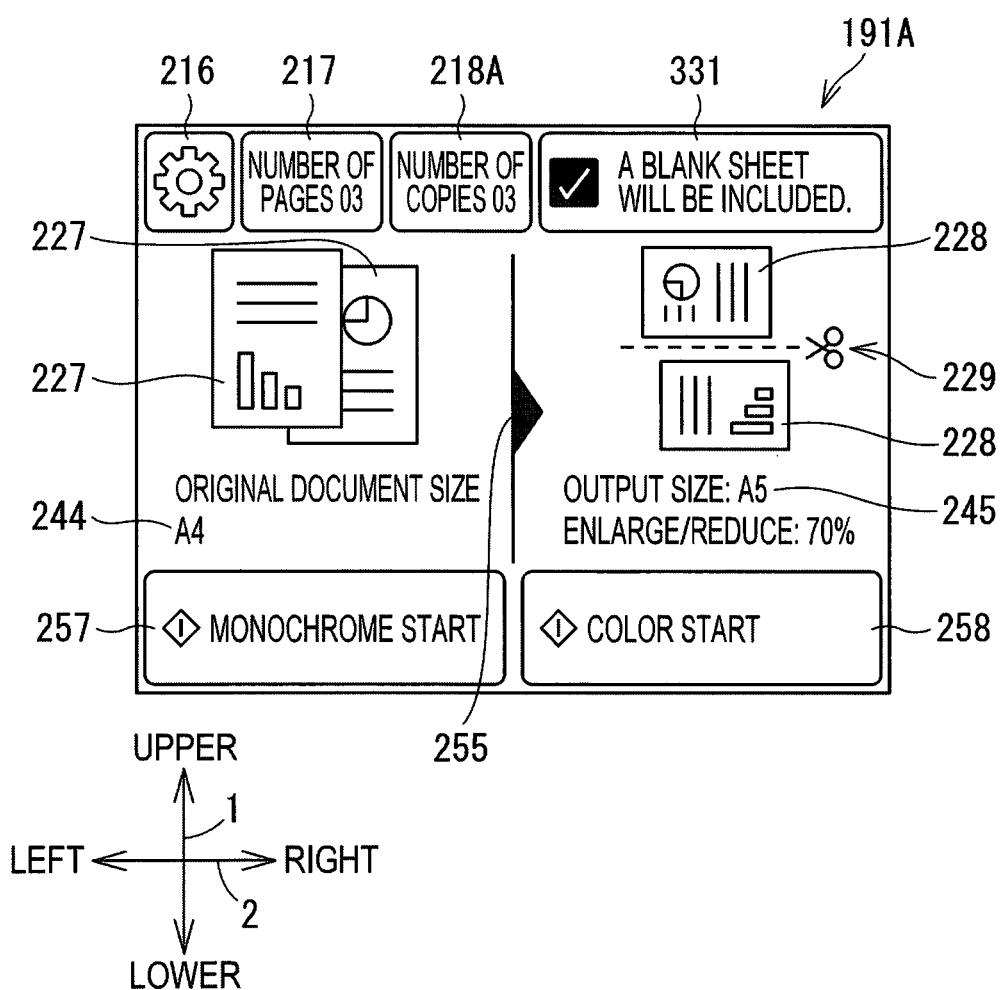
FIG. 15 shows a first setting screen 191A displayed on the LCD 22 of the image recording apparatus 10.

In response to acquiring the preceding recording data, the controller 100 displays a first setting screen 191A shown in FIG. 15. The user selects a fifth reception portion (an example of a fourth object) 218A on the first setting screen 191A by operating the selection button 19*a* and by pressing the enter button 19*b*, thereby setting the number of recording copies for executing the image recording process based on the preceding recording data. By selecting the fourth reception portion 216 and by pressing down the enter button 19*b*, various settings may be made on the first selection screen 192.

The controller 100 determines whether a blank sheet will be left after cutting the recording sheet 8, based on the number of all the pages of the acquired preceding recording data, the number of pieces cut by the cutting process, the setting information of the fourth reception portion 216, information on the number of copies of the fifth reception portion 218A and so on, assuming that printing of the preceding recording data is performed with the current print settings. In response to determining that a blank sheet will be left after cutting, as shown in FIG. 15, the controller 100 displays a remain message 331 on the right side on the uppermost stage on the first setting screen 191A with a check box checked. In response to determining that no blank sheet will be left after cutting, the controller 100 displays the remain message 331 with the check box not checked. The user can recognize whether a blank sheet will be left after cutting by this display before the image recording and can change the settings. The remain message 331 may not have the check box. For example, the controller 100 may notify the user whether a blank sheet will be left after cutting by display or non-display of the remain message 331.

[Operations and Effects of Modification 2]

Since the setting change message 330 on the change of the setting of the preceding recording data is displayed together with the remain message 260A on the first screen 194A, the user recognizes that the setting on the number of recording copies is changeable. This enables the user to consider changing to a setting which does not generate a blank sheet (unrecorded sheet) after cutting the recording sheet 8, which suppresses generation of a blank sheet (unrecorded sheet) after cutting.

When a blank sheet will be left after cutting the recording sheet 8, the user can select a change of the number of recording copies by the setting change message 330. This suppresses a blank sheet after cutting the recording sheet 8.

When one sheet of the recording sheet 8 is cut by the cutter 45 into two sheets, and an image for one page is recorded on each of the cut recording sheet 8, how many sheets of the cut recording sheet 8 will be consumed is determined by the number of recording pages and the number of recording copies. When the number of recording pages is five pages and the number of recording copies is two copies, the total number of recording pages is 10 pages and thus five recording sheets 8 before cutting are consumed, and no blank sheet (unrecorded sheet) will be left after cutting the recording sheet 8. However, if the number of recording pages is five pages and the number of recording copies is three copies, the total number of recording pages is 15 pages, eight recording sheets 8 before cutting are consumed, and a blank sheet (unrecorded sheet) will be left after cutting the recording sheet 8. Since the remain message 331 is displayed based on the setting of the number of recording copies on the first setting screen 191 on which the fifth reception portion 218 for selecting the change of the number of recording copies is displayed, the user can set the number of recording copies while checking whether a blank sheet will be left after cutting the recording sheet 8. This suppresses generation of a blank sheet after cutting the recording sheet 8.

[Modification 3]

In the above-described embodiment, the image recording apparatus 10 is used stand alone, but the present disclosure is not limited thereto. The image recording apparatus 10 may be used by being connected to an external apparatus 344 such as a smartphone 340, a tablet terminal (not shown), a computer 341 and so on via a communication interface (not shown) as shown in FIGS. 16A and 16B.

Figure 16A:
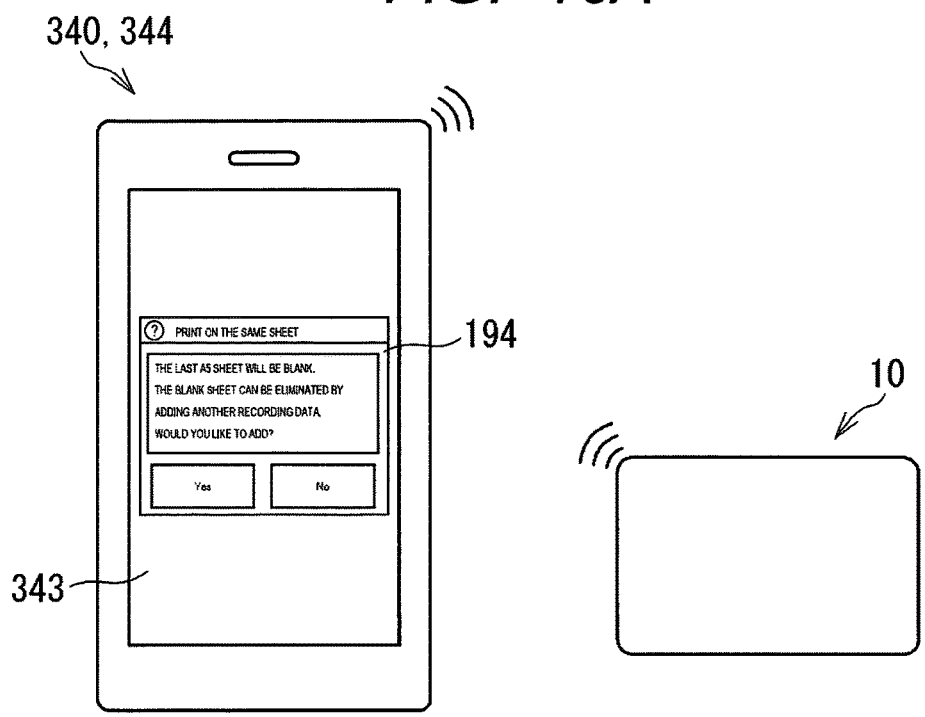
FIG. 16A is a diagram showing the image recording apparatus 10 connected to a smart phone 340.

As shown in FIG. 16A, when the image recording apparatus 10 is connected to the smartphone 340 or the tablet terminal, in the scan function, the image data of the original document 9 read by the scanner section 12 is transmitted to the smartphone 340 or the tablet terminal connected to the image recording apparatus 10 by a wired or wireless communication. The home screen 190, the first setting screen 191, the first selection screen 192, the first screen 194, the second setting screen 195, and the second selection screen 196 are displayed on the smartphone 340 or the tablet terminal.

Figure 16B:
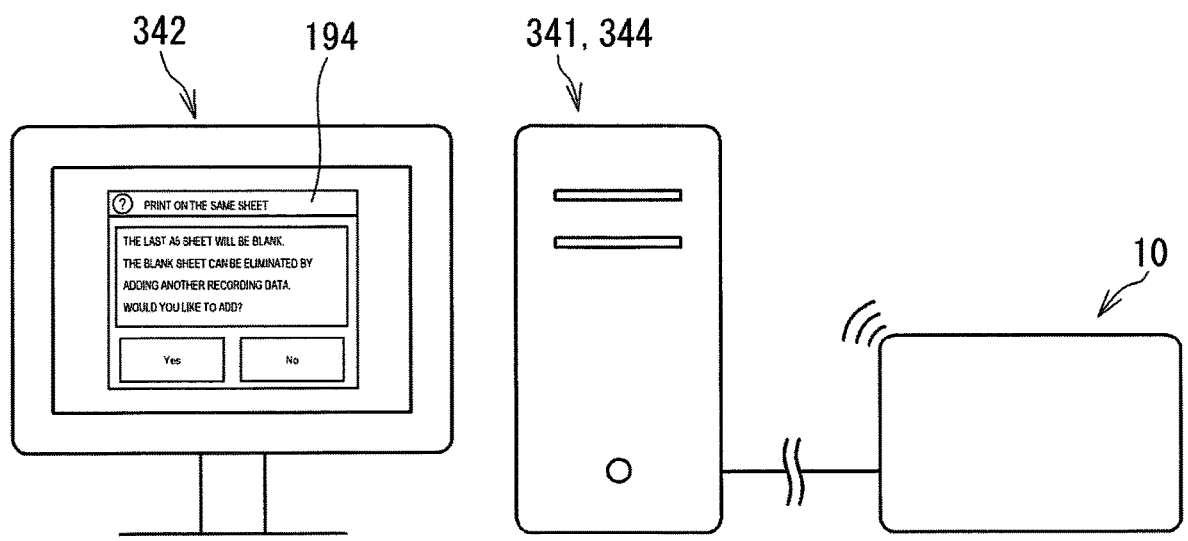
FIG. 16B is a diagram showing the image recording apparatus 10 connected to a computer 341.

As shown in FIG. 16B, when the image recording apparatus 10 is connected to the computer 341, the image data of the original document 9 read by the scanner section 12 is transmitted to the computer 341 connected to the image recording apparatus 10 by a wired or wireless communication. The home screen 190, the first setting screen 191, the first selection screen 192, the first screen 194, the second setting screen 195, and the second selection screen 196 are displayed on a monitor 342 (an example of the display) connected to the computer 341.

[Operations and Effects of Modification 3]

In a case where the cutting process of the recording sheet 8 is executed, a screen 343 of the external apparatus 344 or the monitor 342 displays that a blank sheet (on which an image can be recorded) will be generated after cutting the recording sheet 8. The user recognizes from the external apparatus 344 before the image recording that a blank sheet will be generated after cutting the recording sheet 8, if an image of the data to be executed is recorded. This enables the user to change the setting to that without generating a blank sheet after cutting the recording sheet 8 and to suppress generation of the blank sheet after cutting the recording sheet 8.

[Other Modifications]

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below.

In the above-described embodiment, the recording sheet 8 is cut by the cutter 45 into two sheets, but the present disclosure is not limited thereto. The recording sheet 8 may be cut into three sheets or more by the cutter 45 and so on. As the number of sheets after the recording sheet 8 is cut increases, it becomes difficult for the user to determine from the number of pages of the original document 9 and the number of recording copies whether a blank sheet will be generated after cutting the recording sheet 8. In such a case, it is useful that the LCD 22 displays that a blank sheet will be generated after cutting the recording sheet 8.

In the above-described embodiment, as one example, the A4-size recording sheet 8 is cut at the center position in the conveyance direction into two sheets of the A5-size recording sheet, but the size of the recording sheet 8 or the position where the recording sheet 8 is cut is not limited thereto. The size of the recording sheet 8 to be cut may be A3, B4, B5 and so on in addition to A4 or the recording sheet 8 of a non-standard size may be cut. The position where the recording sheet 8 is cut may be a position shifted from the center position in the conveyance direction of the recording sheet 8. That is, the size of each of the cut recording sheets 8 may be different from each other. The position where the recording sheet 8 is cut is not limited to one position, and the cutting position may be two positions or more in the recording sheet 8, and the cutting may be performed by the cutter 45 into a plurality of pieces.

In the above-described embodiment, as one example, the plurality of original documents 9 are continuously read by the ADF 12c in the reading process, but the present disclosure is not limited thereto. In the reading process, a plurality of the original documents 9 may be loaded by an FBS (flatbed scanner) on the reading area 80B one document at a time by the user so that the reading may be performed. In this case, the image recording apparatus 10 may display a message that the read original document 9 should be removed and replaced with a subsequent page of the original document 9 on the LCD 22.

In the above-described embodiment, as one example, the recording sheet 8 is sandwiched by the rotary blade 83 and the fixed blade 95 at the center position in the conveyance direction and cut along the left-right direction 2, but the present disclosure is not limited thereto. The rotary blade 83 and the fixed blade 95 may be disposed in a direction parallel to the conveyance direction and cut the recording sheet 8 at an arbitrary position in the left-right direction 2 along the front-rear direction 3.

In the above-described embodiment, as one example, an image is recorded only on one side of the original document 9 and is subjected to the reading process by the CIS 85, but the present disclosure is not limited thereto. The image may be recorded on both sides of the original document 9, and the scanner section 12 may include a second CIS for reading the image on a back surface of the original document 9 in addition to the CIS 85.

In the above-described embodiment, as one example, the first selection screen 192 and the second selection screen 196 have each of the items such as the copy quality 291, the sheet type 292, the sheet size 293, the copy quality density 294, the background color removal copy 295, the stack/sort 296, the 2-in-1 ID copy 297, the skew correction 298, and the color/monochrome 299 in addition to the original document size 290, but the present disclosure is not limited thereto. For example, the image recording apparatus 10 may include a configuration capable of double-sided copying and may have an item of the double-sided copying on the first selection screen 192 and the second selection screen 196.

In the selection of the original document size 290, besides the A3 size, the A4 size, the A5 size, the B4 size, and the B5 size, automatic detection of the size of the original document 9 to be read by the scanner section 12 may be provided. At this time, it is displayed that the original document size is automatic detection on the first size-information display 244.

In the above-described embodiment, when the original document size 290 is selected on the first selection screen 192 and the second selection screen 196, the original document size 290 is displayed in characters on the first size-information display 244 of the first setting screen 191 and the second selection screen 196. Further, the first size-information display 244 may have a function of receiving a change of the original document size. That is, the first size-information display 244 may be a reception portion which receives an operation by the user.

In the above-described embodiment, as one example, the operation interface 19 and the LCD 22 are provided on an upper part on the front surface of the image recording apparatus 10, and the screen is operated by the operation of the operation interface 19, but the present disclosure is not limited thereto. The operation interface 19 and the LCD 22 may be touch panels.

In the above-described embodiment, the cutter 45 cuts the recording sheet 8 with the rotary blade 83 and the fixed blade 95, but a structure of the cutter 45 is not particularly limited. For example, for the cutter 45, two disk-shaped rotary blades such as the rotary blade 83 may be mounted on the cutter carriage 82, instead of the fixed blade 95.

In the above-described embodiment, as one example, after the image of the A4-size original document 9 subjected to the reading process is recorded on the A4-size recording sheet 8, the recording sheet 8 with the image recording is cut into two sheets of the A5-size sheet, but this order may be changed. For example, after the A4-size recording sheet 8 is cut into two sheets of the A5-size recording sheet 8 by the cutting process, an image of the original document 9 subjected to the reading process may be recorded on each recording sheet 8. That is, the order of image recording and cutting may be changed.

In the above-described embodiment, the screen transitions (changes) in response to the various icons selected by the user, but the transition of the screen is not limited to a case of switching of the entire screen displayed on the LCD 22 but also includes a case of switching of a part of the screen.

In the above-described embodiment, as one example, when the user performs the operation of executing the reading process, the image recording process, and the cutting process on the home screen 190, the controller 100 displays the first setting screen 191 on the LCD 22, but the present disclosure is not limited to this. For example, the controller 100 may perform pop-up display of the first setting screen 191 within an arbitrary region in the LCD 22. The LCD 22 may have a message display bar (not shown) displaying various messages at a position within an arbitrary region of the LCD 22 or other than the LCD 22 and display the display contents of the first setting screen 191 described above on the message display bar.

What is claimed is:

1. An image recording apparatus comprising:
   a conveyor configured to convey a sheet in a conveyance direction;
   a print engine configured to perform image recording of recording an image on the sheet conveyed by the conveyor;
   a cutter configured to cut the sheet;
   a display configured to display a screen; and
   a controller configured to:
      control the print engine to perform the image recording based on acquired first recording data;
      control the cutter to cut the sheet at a particular position; and
      in response to determining that recording of the first recording data is not performed on at least one of sheets acquired by cutting of the cutter, control the display to display a first object indicating that a blank sheet will be generated after the cutting, the blank sheet being a sheet on which an image can be recorded.

2. The image recording apparatus according to claim 1, wherein the controller is configured to display the first object before starting the image recording and the cutting.

3. The image recording apparatus according to claim 1, wherein the controller is configured to display the first object after starting the image recording and before discharging the blank sheet.

4. The image recording apparatus according to claim 1, wherein the controller is configured to:
   control the display to display a second object together with the first object, the second object relating to change of a setting of the first recording data.

5. The image recording apparatus according to claim 4, wherein the controller is configured to:
   control the display to display a first screen including the second object, the first screen further including a third object relating to addition of second recording data.

6. The image recording apparatus according to claim 5, wherein the controller is configured to:
  control the display to display a first setting screen relating to a setting when performing the image recording based on the first recording data by the print engine;
  control the display to display the first screen after receiving a start command for starting the image recording based on a condition set in the first setting screen; and
  in response to selection of the third object, control the display to display a second setting screen relating a setting when performing the image recording based on the second recording data by the print engine; and
  wherein a part of setting items in the second setting screen is limited compared with the first setting screen.

7. The image recording apparatus according to claim 6, wherein the first setting screen includes a fourth object for changing a setting of a number of recording copies of the first recording data; and
  wherein the controller is configured to:
    in response to determining that the blank sheet will be generated after the cutting based on the setting of the number of recording copies, control the display to display the first object in the first setting screen.

8. The image recording apparatus according to claim 1, wherein the controller is configured to:
  control the display to display an addition inquiry object together with the first object, the addition inquiry object relating to addition of second recording data.

9. The image recording apparatus according to claim 1, further comprising a scanner,
  wherein the controller is configured to control the scanner to scan an image of a document to generate the first recording data.

10. The image recording apparatus according to claim 9, wherein the controller is configured to:
  control the display to display a scan addition object together with the first object, the scan addition object relating to addition of another scan; and
  in response to selection of the scan addition object, control the scanner to scan a document to generate third recording data and perform the image recording based on the third recording data on the blank sheet.

11. The image recording apparatus according to claim 8, wherein the controller is configured to:
  determine whether a last page is included in an acquired portion of the first recording data;
  in response to determining that the last page is included, determine whether the blank sheet will be generated after the cutting; and
  in response to determining that the blank sheet will be generated after the cutting, control the display to display a first screen including:
    the first object;
    the addition inquiry object;
    an addition object configured to receive an instruction to perform the image recording and the cutting by adding the second recording data; and
    a non-addition object configured to receive an instruction to perform the image recording and the cutting without adding the second recording data.

12. The image recording apparatus according to claim 4, wherein the controller is configured to:
  determine whether a last page is included in an acquired portion of the first recording data;
  in response to determining that the last page is included, determine whether the blank sheet will be generated after the cutting; and
  in response to determining that the blank sheet will be generated after the cutting, control the display to display a first screen including:
    the first object;
    the second object;
    a change object configured to receive an instruction to perform the image recording and the cutting by changing the setting of the first recording data; and
    a non-change object configured to receive an instruction to perform the image recording and the cutting without changing the setting of the first recording data.

13. A non-transitory computer-readable storage medium storing a set of program instructions for a computer connected to an image recording apparatus and a display, the image recording apparatus including a conveyor configured to convey a sheet in a conveyance direction, a print engine configured to record an image on the sheet, a cutter configured to cut the sheet, and a controller, the set of program instructions, when executed by the computer, causing the computer to perform:
  generating image data information from acquired first recording data, the image data information being information for performing image recording of recording an image on a sheet by the print engine;
  generating sheet cutting information, the sheet cutting information being information for cutting the sheet at a particular position in the conveyance direction by the cutter;
  transmitting the image data information and sheet cutting information from the controller to the print engine and the cutter; and
  in response to determining that recording of the first recording data is not performed on at least one of sheets acquired by cutting of the cutter, transmitting a signal for displaying a first object on the display, the first object indicating that a blank sheet will be generated after the cutting, the blank sheet being a sheet on which an image can be recorded.

14. An image recording apparatus comprising:
  a communication interface configured to be connected to an external apparatus;
  a conveyor configured to convey a sheet in a conveyance direction;
  a print engine configured to perform image recording of recording an image on the sheet conveyed by the conveyor;
  a cutter configured to cut the sheet;
  a display configured to display a screen; and
  a controller configured to:
    control the print engine to perform the image recording based on acquired first recording data;
    control the cutter to cut the sheet at a particular position in the conveyance direction; and
    in response to determining that recording of the first recording data is not performed on at least one of sheets acquired by cutting of the cutter, control the display to display a first object indicating that a blank sheet will be generated after the cutting, the blank sheet being a sheet on which an image can be recorded.

* * * * *